United States Patent [19]
Von Kohorn

[11] Patent Number: 4,926,255
[45] Date of Patent: * May 15, 1990

[54] SYSTEM FOR EVALUATION OF RESPONSE TO BROADCAST TRANSMISSIONS

[76] Inventor: Henry Von Kohorn, 945 Treasure La., Vero Beach, Fla. 32963

[*] Notice: The portion of the term of this patent subsequent to May 17, 2005 has been disclaimed.

[21] Appl. No.: 192,355

[22] Filed: May 10, 1988

Related U.S. Application Data

[63] Continuation-in-part of Ser. No. 837,827, Mar. 10, 1986, Pat. No. 4,745,468.

[51] Int. Cl.$^5$ .............................................. H04H 9/00
[52] U.S. Cl. ...................................... 358/84; 358/86; 379/72; 455/5; 434/323
[58] Field of Search ...................... 358/84, 86; 379/91, 379/92; 434/307, 316, 323, 350, 351, 362; 455/2, 5; 902/23, 39

[56] References Cited

U.S. PATENT DOCUMENTS

| | | | |
|---|---|---|---|
| 3,606,688 | 9/1971 | Zawels et al. | 434/323 |
| 4,044,380 | 8/1977 | Justice et al. | |
| 4,264,924 | 4/1981 | Freeman | 358/86 |
| 4,268,744 | 5/1981 | McGeary | |
| 4,271,351 | 6/1981 | Bloodworth | |
| 4,286,323 | 8/1981 | Meday | 364/411 |
| 4,541,806 | 7/1985 | Zimmerman et al. | 434/362 X |
| 4,573,072 | 2/1986 | Freeman | 358/86 |
| 4,592,546 | 6/1986 | Fascenda et al. | |
| 4,630,108 | 12/1986 | Gomersall | 358/84 |
| 4,671,772 | 6/1987 | Slade et al. | 434/350 X |
| 4,745,468 | 5/1988 | Von Kohorn | 358/84 |

FOREIGN PATENT DOCUMENTS 1287304 8/1972 United Kingdom ................ 434/323

OTHER PUBLICATIONS

SYNC Catalog, pp. 2–3; "Now You Can Beat the Contestants on TV's Most Popular Game Show".

*Primary Examiner*—Keith E. George
*Attorney, Agent, or Firm*—Perman & Green

[57] ABSTRACT

A system and method for evaluating responses to broadcast programs, such as television programs, includes an instructional signal modulated onto a voice signal transmitted concurrently with the television program, or time-multiplexed with a television. At each of a plurality of remote receiving stations, one or more members of a remote audience has the opportunity to respond to a situation presented in the television program by entering a response on a keyboard. The system includes, at each remote receiving station, a memory responsive to the instructional signal for storing desired responses, and a comparison circuit for comparing responses entered at the keyboard with those stored in the memory. Also provided is electronic circuitry for scoring the responses in accordance with commands from the instructional signal, and a recording device for providing a permanent record of the audience score at each of the remote receiving stations. Scoring is performed at differing levels of difficulty, set by a host or by a contestant, with credit being given also to the length of time required for response and the mode of response such as by use of a key word or phrase.

93 Claims, 7 Drawing Sheets

SYSTEM FOR EVALUATION OF RESPONSE TO BROADCAST TRANSMISSIONS

BACKGROUND OF THE INVENTION

This application is a continuation-in-part of copending application Ser. No. 837,827 filed Mar. 10, 1986, now U.S. Pat. No. 4,745,468.

This invention relates to transmission by broadcast media including radio and television broadcasting programs to listeners and viewers of the programs and, more particularly, to the transmission of signals designating questions or tasks, to response criteria for evaluating responses of the listeners and viewers of the broadcast programs, and to the dispensing of awards to individual listeners and viewers having provided answers meeting the response criteria.

A common form of program transmitted by the broadcast media is the quiz program. Typically, in such a program, a panel of people provide answers to questions arising from the subject matter of the quiz. Often, the answers are indicated by use of a keyboard with electronic circuitry. The answers may be provided in response to questions which are asked directly, or in response to a situation or task presented by the program such as in the solving of a puzzle.

A characteristic of such quiz programs is the fact that the responses to the questions are limited to participants in the studio audience. The much larger external audience, namely the listeners of radio and viewers of television, are generally excluded from participation except for those few people who, on occasion, may have the opportunity to call in a response via telephone to a situation arising in the program. Letter writing has also been employed as a means of response to questions and other matters raised by the program.

Thus, it is apparent that a problem exists: in that a large percentage of the external audience is essentially excluded from active participation in the broadcast programs. In view of the fact that the studio audiences can provide their responses electronically, it is clear that personal involvement, such as conversation among participants, is not necessarily required. It is, therefore, apparent that such programs should be open to participation by the larger external audience in addition to the studio audience; yet, no system providing for such participation has been available.

It is noted that this problem is not limited to quiz programs only, but that other forms of programs in the areas of education and research might also be conducted in a fashion allowing active public participation if a suitable system were available to make such public participation possible. A desirable feature of such a system would be the capability for evaluating and recording the responses, a feature that would be very useful in the case of educational programs because such a feature would permit a teacher to grade examinations dispensed to students by the broadcast media. Such a system would also be useful in commercial ventures wherein a prize is to be given to a participant providing an acceptable answer. In such a case, the participant would bring the recorded answer, which might be in the form of a coded credit card, to a store or other establishment for receipt of the prize. This would be a great convenience in the implementation of a sales and advertising program. Responses by the listening or viewing audience can also be used in conducting a survey of public opinion. However, in spite of the advantages which would be provided by such a system, for including the listening and viewing audience, no such system has yet been available.

SUMMARY OF THE INVENTION

The foregoing problem is overcome, and other advantages are provided by a system for the evaluation of response to broadcast programs which, in accordance with the invention, provides for the transmission of signals designating questions and response criteria along with transmission of the broadcast program. The invention includes both method and system aspects which create added interest and excitement among viewers, and thus tend to increase watching of the television stations carrying programs of the type to be described hereinafter.

In accordance with the theory of the invention, two groups of signals are broadcast, wherein each of the two signal groups may be divided in two portions designated as first and second signals. In the first signal group, the first of the two signals includes the program signal itself which may be broadcast from a radio station or television station to the listening or viewing audience. The second signal of the first group is a signal transmission setting forth a task, such as the answering of one or more questions which may be viewed on a television screen and/or listened to over radio or the audio portion of the television transmission. For simplicity in describing the invention, an audience viewing a televised program is presumed. It is understood that the description of the invention in terms of the viewing audience applies also to the listening audience of a radio broadcast.

The second of the two signal groups is in the nature of an instructional signal group identifying the questions to be answered, the amount of time available for an answer, a mode of scoring the answers, and the proper content and form of an acceptable answer. In one embodiment of the invention, the first signal of the second signal group sets forth the desired answer or answers, and the second signal provides the mode of scoring responses, such as the parameters, formulas and other criteria to be employed in the scoring of the answers. Therefore, in this one embodiment of the invention, the two signal groups include at least four sets of signals which are transmitted, each of which can be varied independently of the other, and which may be transmitted concurrently or at different times.

Included at the site of each viewer in the external or remote audience is a television set, plus electronic response equipment having circuitry for reception of the instructional signal group transmitted from a central station, the response equipment also including a keyboard for designating answers or responses to the questions, a display for viewing answers entered by the keyboard, timing circuitry, scoring circuitry, and a recording device for recording answers to the question. The recording device includes preferably a dispenser for dispensing a record such as a printout, a magnetizable card containing a person's responses to the questions and/or a person's score in answering the questions.

A particular advantage of the invention is the capacity for interaction between a person conducting a broadcast program and the external audience. This may be illustrated by way of example wherein a sportscaster is describing a sporting event such as a football game.

The questions asked by the sportscaster may pertain to the winning team, to plays that have been accomplished, as well as to questions which may be called in by telephone from the listening/viewing audience. During the program, commercials may be aired, and various products and/or services may be described and offered to the viewing audience.

In the practice of the invention, it is noted that signals of the instructional signal group, Group Two, may be transmitted before, concurrently, or subsequent to the transmission of the program signals in accordance with the nature of the questions and responses required. For example, in the event that the program situation deals with a college professor giving an examination, the correct or acceptable answers to the various questions and the procedure for scoring answers to individual ones of the questions can be transmitted before the lecture in which the professor asks the questions. In the event that a limited period of time is available for response to each of the questions, then, at least a portion of the instructional signals, Group Two, must be sent concurrently with the program data, this portion being a timing signal which the professor would initiate when he asks the question. The timing signal would initiate operation of a timer in the electronic equipment at each of the receiving stations which are tuned to the broadcast program, the timer then clocking a requisite amount of time in accordance with an instructional signal which has been previously transmitted or is concurrently transmitted with the program data. In yet a further example, in the case of an interactive situation wherein the professor is responding to a comment made by a student in the classroom or, possibly in response to a telephoned inquiry, the professor may then ask a question for which the instructional signal designating the nature of the response would be transmitted after the question has been asked.

At a receiving station the electronic equipment includes a keyboard by which a viewer of the broadcast program enters a response. The response should be a desirable or correct response, or at least an acceptable response in order to receive credit. The response is stored in a buffer store for comparison with a correct or acceptable response which is stored in a data memory. The correct response is provided as a data input to the data memory by the instructional signal group. The comparison is provided by comparison circuitry which outputs a signal via timing circuitry to a score counter to provide a score at the conclusion of responses to a question. The timing circuit, under control of a program memory, is activated upon request from the host of the transmitted program. Instructional signals transmitted by the host are modulated onto the audio portion of the transmitted signals and, subsequently at a receiving station, are demodulated and decoded to provide the data signals for the data memory, synchronization signals for operation of the timing circuitry, and instructional signals for operation of the program memory. Alternatively, the instructional signals may be transmitted at television frequencies by known methods, such as the use of vertical blanking intervals or other unused parts of a television transmission. The resulting score from the score counter may be recorded in a readout device which, in a preferred embodiment of the invention, provides a printout or a card with an encrypted value of the score in a magnetic strip that is readily read by automatic card readers. According to one embodiment, a register may be included for the storage of responses which are printed or typed out in the form of a message. The message may be passed on to the readout device under instruction of the program memory.

At each of the remote receiving stations, circuitry responsive to the third signals is provided for implementing the response criteria. In particular, provisions are made to evaluate responses to the same question at different difficulty levels. For example, different amounts of credit can be given based on the speed at which a viewer responds to the question.

Also answers showing a more detailed, accurate or comprehensive understanding can be weighted to provide greater credit for responding to the question. If desired, a set of response criteria may include only one difficulty level.

The readout or dispensing device provides a printout having at least two sets of information. The information may be provided on a tape or card in printed lettering or in a bar code format to show the value of any award which might be given, and a verification of the fact that the award has been made. The printout may also verify the identity of the person answering the question. The verification may be provided either by a signal transmitted from a central station as part of the instructional group of signals to be stored at the remote location or, alternatively, by use of a validation code taking the form of alphanumeric data and/or other symbols, such as a machine readable code, which the dispenser is capable of printing. The value of the award is printed preferably in alphanumeric form so as to be readily understandable by the participant.

In the event that a two-way cable system is available, such system may be used to advantage in the practice of the invention by providing for transmission of the television program to a remote audience while also enabling members of the remote audience to communicate responses or other commentary back to the broadcasting station.

BRIEF DESCRIPTION OF THE DRAWING

The aforementioned aspects and other features of the invention are described in the following description, taken in connection with the accompanying drawing wherein.

DETAILED DESCRIPTION

In the following description, FIGS. 1-5 disclose embodiments of the invention useful for programs to be conducted with participation from remote audiences. In the disclosure of FIGS. 6-10, the system is adapted for a greater selection of and modification of, parameters in criteria for evaluating answers to questions. The criteria are controllable from a central station. The embodiment of the system of FIGS. 1-5 is described in terms of two signal groups, namely, a radio/television signal group, Group One, and an instructional signal group, Group Two. The embodiment of the system of FIGS. 6-10 is described with reference to at least four types of signals, namely, a television signal presenting a studio scene (TV program), a television signal presenting a task such as a set of questions (task signal), a signal setting forth acceptable answers to questions (response criteria), and a signal setting forth criteria to be employed in the evaluation of the answers (scoring mode). The system of FIGS. 1-5 will be described first, this being followed by a description of the system of FIGS. 6-10.

Figure 1:
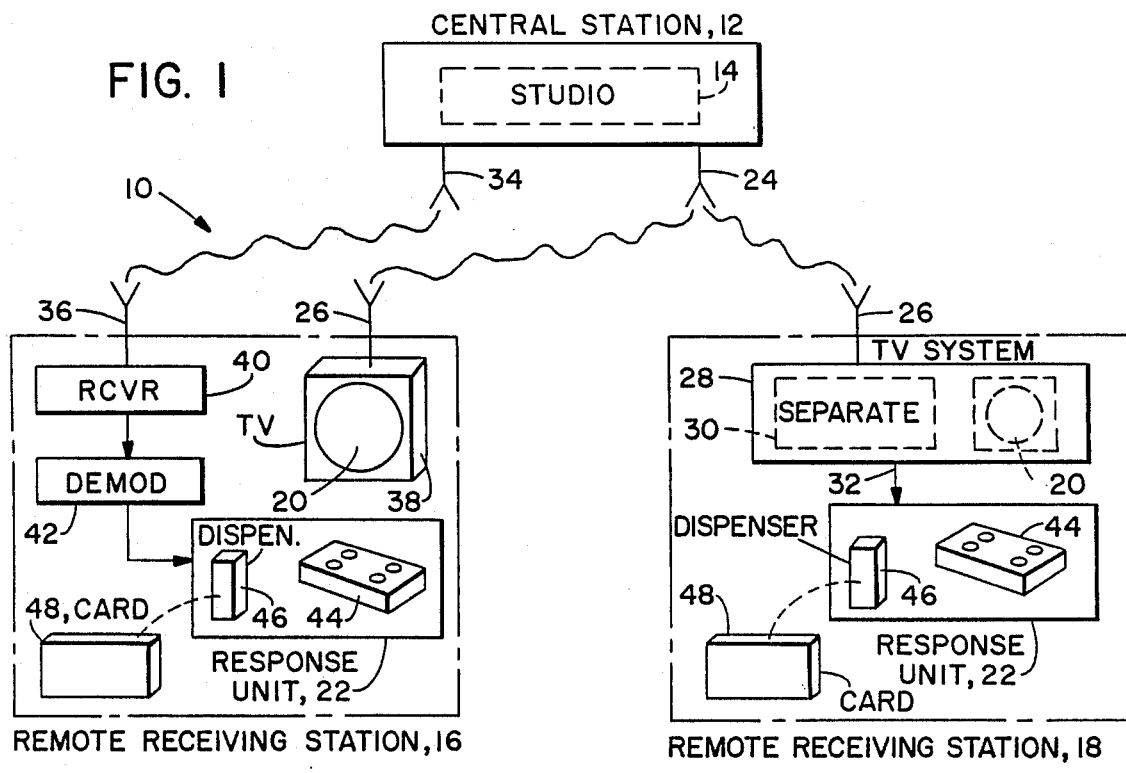
FIG. 1 is a simplified diagrammatic: view of a system incorporating the invention and configured to show two embodiments of receiving stations, one receiving station employing simulcast radio and television signals of a program produced in a studio, and the second receiving station employing a television receiver system modified to receive an instructional signal from the studio.

FIG. 1 presents a simplified description of a system 10 wherein a central station 12 includes a studio 14, such as a television studio which broadcasts programs to many external or remote receiving stations, two such receiving stations 16 and 18 being shown by way of example. In accordance with the invention, each of the receiving stations 16 and 18 includes means for observing the broadcast program, such as a television screen 20, and means by which persons in the external viewing audience can respond to situations presented in the studio, the response means being a response unit 22 which evaluates and records responses entered by persons in the viewing audience.

Two signals are broadcast by the central station 12 to each of the receiving stations 16 and 18. One of these two signals is a program signal for presenting on the television screen 20 a program generated in the studio 14. The second of the two signals is an instructional or command signal for operation of the response unit 22, the instructional signal providing appropriate commands to the response unit 22 for evaluating, rejecting or accepting, and scoring audience responses to questions raised in the televised program.

Two modes of transmission are provided for the two signals. In the case of the receiving station 18, both of the signals are carried by a single television channel carrier radiated from an antenna 24 of the central station 22, and received by an antenna 26 at the receiving station 18. The antenna 26 connects with a television system 28 which includes the foregoing television screen 20 and, furthermore, includes circuitry 30 for the separation of the instructional signal from the program signal. The instructional signal is then applied via line 32 to the response unit 22. In the case of the receiving station 16, the two signals are processed separately. The instructional signal is broadcast by a radio channel employing a radio antenna 34 at the central station 12, and received by an antenna 36 at the receiving station 16. Thus, at the receiving station 16, a standard television set 38 including the screen 20 receives the televised program via antenna 26 and presents the program on the screen 20. A separate radio receiver 40 and demodulator 42 are employed for receiving the instructional signal and for applying the instructional signal to the response unit 22.

In the practice of the invention, the instructional signal may be transmitted to a remote receiving station in any convenient manner such as via a cable transmission or by a specially broadcast transmission (not shown) or by combining the instructional signal with the audio signal in a radio broadcast or television broadcast. The combination of the instructional signal with the audio spectrum is demonstrated in the graph of FIG. 2 which shows a typical relationship of amplitude versus frequency in a transmitted audio spectrum. In that spectrum, a relatively narrow frequency band is set aside for transmission of the instructional signal, the narrow frequency band being at the upper frequency edge of the audio spectrum.

For example, the bandwidth of the instructional signal may be approximately 1% of the audio bandwidth, this being sufficient to enable a relatively slow transmission of instructional data to the response units 22 in the respective receiving stations. By maintaining the amplitude of the instructional signal well below that of the audio signal, the instructional signal does not introduce more than a negligible amount of interference with the audio signal. Also, it is noted that the instructional signal is not continuously present but, rather, appears only for a momentary burst of time, typically less than a few seconds duration, when necessary to instruct each response unit 22. In the case of the receiving station 16, a simulcast of radio and television is employed while, in the case of the receiving station 18, only the television program is broadcast, as has been described above. However, in both cases, the audio spectrum is the same, and the mode of combining the instructional signal with the audio transmission is the same. Typically, the system 10 would be implemented with only one of the transmissions, either the television transmission with the instructional signal combined therewith, as demonstrated by the receiving station 18, or by the simulcast of both the television and the radio transmissions as demonstrated by the receiving station 16. In the case of the simulcast, the instructional signal need not be combined with the television signal, the instructional signal appearing only in the radio broadcast from the antenna 34 as described above.

The receiver 40 and the demodulator 42 operate in a manner similar to that of the separation circuitry 30, and will be described in detail hereinafter, with reference to FIG. 3.

In both of the receiving stations 16 and 18, the response unit 22 includes a keyboard 44 whereby a person in the remote viewing audience enters a response. The response unit 22 includes a dispenser 46 which dispenses a record of the score and/or responses in a permanent recording medium such as a card 48 of plastic, or similar material, and including a well-known strip of magnetizable material (not shown) upon which the score and/or responses have been recorded. Alternatively, by way of example, the dispenser 46 may be constructed in a form (not shown) for outputting a tape which has been imprinted or punched with the desired information. Easily recognizable indicia may also be imprinted on the tape or card.

The system described lends itself well to multi-part questions and/or to multiple choice answers, for any of which special forms can be provided, to be filled in or otherwise marked. The response recording and/or data entering means can have provisions for the insertion of special forms or blanks, which can be made available or mailed to participants. For example, a school may mail to students forms specially prepared for a particular examination or assignment. The response unit 22 may therefore be configured to hold a recording medium such as a paper blank to which markings are applied. Alternatively, the medium, such as paper tape, discontinuous or continuous forms, may be inserted by the respondents.

Examination papers, whether taking the shape of forms to be filled in, or the result of a free hand composition or narrative, may also be graded by the comparator means, which is capable of identifying key phrases and words that are expected to appear on the completed examination paper. In similar fashion, comparator means to be described hereinafter is designed so as to be able to recognize and accept any one or more of a plurality of predetermined key words, symbols or phrases.

Dispenser 46 can be adapted to reward children who have provided answers meeting the predetermined response criteria by dispensing gold stars or other tokens. In another embodiment, the dispenser combines the coupons issued to winners with advertising material or shopping hints.

The records created pursuant to the present invention may be used as tokens, coupons, certificates and general proof of participation in the broadcast transmission program. Coupons may be redeemed by mail or in retail establishments for cash, prizes or discounts.

The following terms are useful in describing the system of the invention.

The term "task-setting" is intended to include the meaning of interrogative, opinion-eliciting and statement-eliciting, as well as the soliciting of creative endeavors and all kinds of functions capable of being performed by an entry in a data entering device.

The terms "evaluating" and "scoring" are intended to refer to and include the meanings of sorting, counting, screening, evaluating, analyzing and processing information, data and responses in accordance with predetermined criteria, ranging from simple comparing tasks to computerized processing and analyses.

The term "interactive system" refers to a system for communicating from a sender to a respondent and having the capacity for allowing the sender to receive a communication, when desired, from the respondent whether by manual or electronic means.

The term "response" is intended to include answers, elicited opinions and statements, text and narrative provided by contestants, respondents, students and other participants in broadcasts calling for interaction, reaction and responses. The term "processed response" is intended to refer to and include the results produced by screening, sorting, scoring, evaluating, massaging, statistically analyzing, or otherwise machine-processing responses, data and information provided by participants at the receiving stations. The term "hard copy" is intended to refer to and include any kind of permanent record capable of being visually read, scanned or machine read. The term "simulcast" is intended to refer to the simultaneous, but separate transmission from different propagating sources of the video and audio portions of a program.

In the context of formulating response criteria, the terms "formulate", "generate", "format" and "reformat" are intended to refer to and include the selection and determination of all factors affecting the evaluation and scoring of responses.

The term "keypad" is understood to include other forms of data entry devices, the keyboard being presented by way of example.

The term "print-out" is intended to include printed, embossed, punched, stamped, and other types of hard copy, paper, cardboard and plastic in the form of coupons, certificates, tokens, cards, forms and matrices.

The term "central" as used, for example, in "central location", is intended to refer to a broadcast station or network serving a country, a time zone or a region, and also is intended to include discrete local broadcast stations operating independently and serving a town or other smaller geographic area, always provided that such "central" station serves a multiplicity of remote receiving stations. The terms "remote" or "external" as used for example in "external audience", are intended to include all television viewers and radio listeners tuned into an electronic transmission station, irrespective of the distance from such central station; as such, a "remote" audience includes, for example, students or other respondents positioned in close proximity to the source of a program, as in the case of a closed circuit transmission.

The term "interval" is intended to mean time interval or period of time.

The term "reward" is intended to include in its scope discounts, prizes, free merchandise, monetary awards and other rewards having monetary or symbolic value.

The term "host" is intended to include an on-stage and an off-stage announcer, master of ceremonies, program director, guest host and celebrities, announcers of commercials and any other individual associated with the program or appointed to carry out one or more of the activities enumerated herein.

The term "difficulty level" is intended to include difficulty levels set by the host and inherent in the task or question, as reflected by possible answers, as well as difficulty levels inherent in a response or answer set by a respondent based on the speed, accuracy, comprehensiveness or responsiveness of the response and reflecting respondent's confidence in his or her knowledge of the subject matter.

In the formulation of a response to a question by a member of the external television audience, in the ensuing description reference will be made to a response in terms of recognition of key words as well as responses which require several words as in a phrase, sentence, formula and the like. It is to be understood that, in the generation of such responses, the term "word" includes also alphanumeric characters and other symbols such as pictorial representations which may be required as a proper response to a question.

With respect to various embodiments of the invention, the response unit 22 may be configured to provide the foregoing functions of evaluating and scoring, as well as the processed response.

Figure 3:
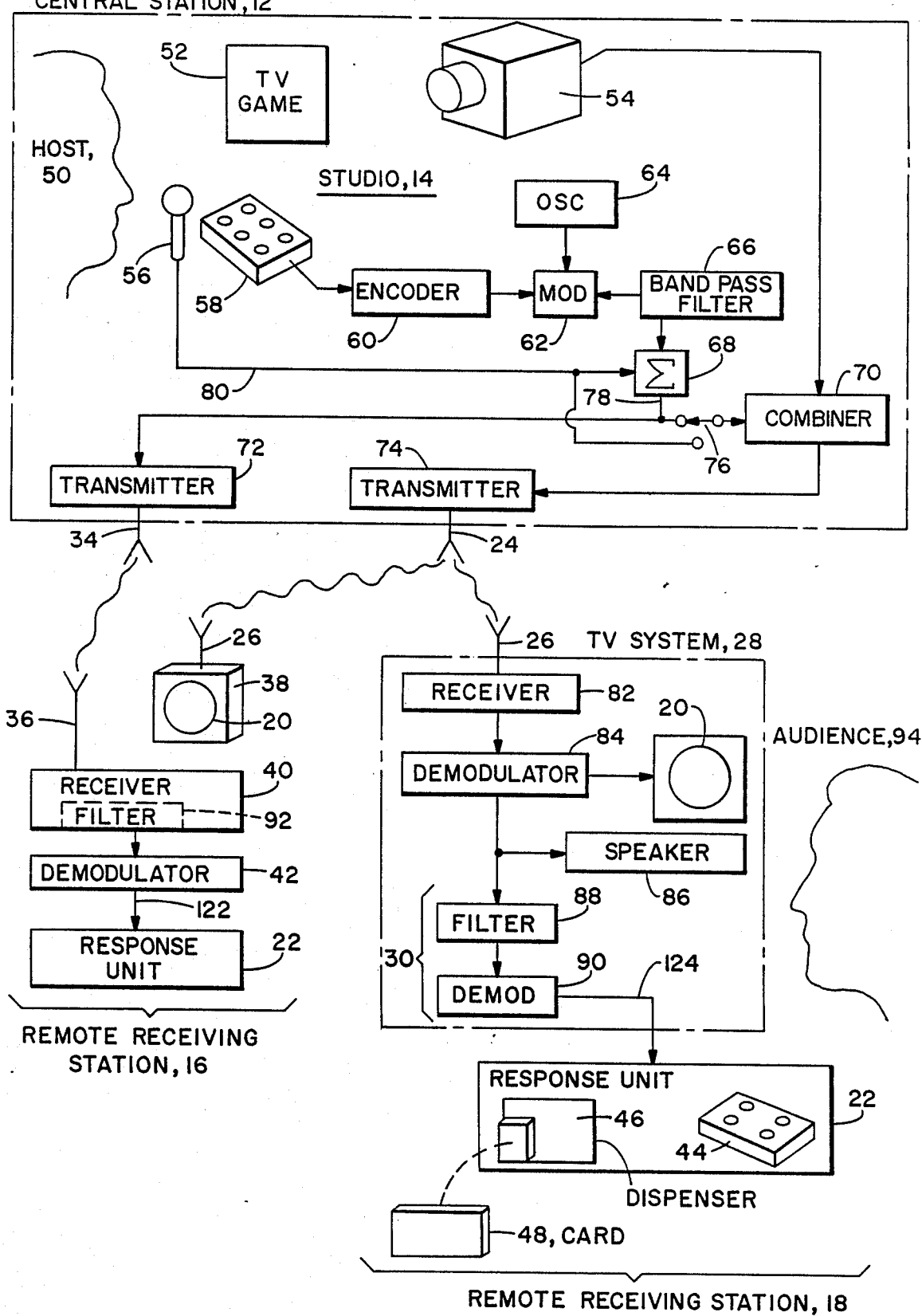
FIG. 3 is a detailed diagram of the system of FIG. 1.

In FIG. 3 the studio 14 is shown, by way of example, to include a television host 50, conducting a quiz program or game 52 in front of a television camera 54 which views both the game 52 and the host 50, and, also including when required, display means on stage (not shown) to provide an image thereof, which image is televised or only visible to the studio audience. Words spoken by the host 50, as well as other sounds in the studio 14, are converted by a microphone 56 to electric signals. Also included within the studio 14 is a keyboard 58 by which the host 50 or another person, enters commands and instructions to be communicated via the instructional signal. The central station 12 further comprises an encoder 60 a modulator 62, an oscillator 64, a bandpass filter 66, a summer 68, a combiner 70, a radio transmitter 72, a television transmitter 74, and a switch 76. The switch 76 connects an input terminal of the combiner 70 to either an output terminal of the summer 68 on line 78 or an output terminal of the microphone 56 on line 80.

In operation, the pressing of keys on the keyboard 58 activates the encoder 60 to output digital signals representing the keys which have been pressed. The oscillator 64 outputs a carrier signal which is modulated by the modulator 62 with the digital signals outputted by the encoder 60. The modulator 62 applies the modulated carrier signal to the filter 66 which narrows the bandwidth of the modulated signal to equal the instructional bandwidth shown in FIG. 2. The filtered signal is coupled from the filter 66 to one input terminal of the summer 68, a second input terminal of the summer 68 receiving the output electrical signal from the microphone 56 via line 80. An output signal of the camera 54 is connected to one input terminal of the combiner 70, a second input terminal of the combiner 70 being connectable via the switch 76 in line 78 to an output terminal of the summer 68. In the alternative position of the switch 76, the second input terminal of the combiner 70 is connected via line 80 to receive the output electric signal of the microphone 56 rather than the output signal of the summer 68. An output terminal of the combiner 70 is connected to the television transmitter 74. Signals outputted by the summer 68 are connected via line 78 also to the radio transmitter 72.

Figure 2:
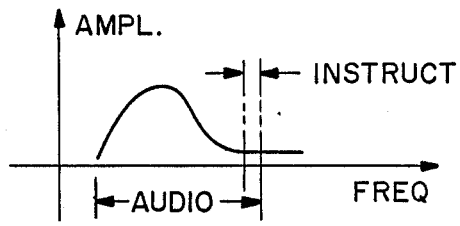
FIG. 2 shows the audio spectrum and a portion thereof designated for an instructional signal.

The signal outputted by the bandpass filter 66 is the instructional signal which is to be transmitted via either the transmitter 72 or 74 to a remote receiving station. The signal outputted by the microphone 56 is the audio signal component of the signals transmitted in the television channel via the transmitter 74, and is also transmitted via the radio transmitter 72 to the remote receiving stations when a radio transmission of the audio portion of the activity in the studio 14 is desired. The summer 68 performs the function of combining the instructional signal with the audio signal whereby the instructional signal shares a small fraction of the audio spectrum as shown in FIG. 2. This is accomplished by adding the output signals of the microphone 56 and the filter 66 to output the sum signal on line 78. The combiner 70 functions, in a well-known fashion, to combine the video portion of the television channel signal from the camera 54 with either the microphone signal on line 80 or the composite signal of the summer 68 depending on the position of the switch 76.

In the event that the simulcast of both the radio and the television transmissions is to be provided by the transmitter 72 and 74, the switch 76 connects the combiner 70 to line 80 in which case the television signal transmitted by the transmitter 74 has the standard format of video and audio portions without the instructional signal, the latter being transmitted via the radio transmitter 72. In the event that the switch 76 is connected to line 78, then the television signal transmitted by the transmitter 74 includes the instructional signal within the audio portion of the television signal.

The circuitry of FIG. 3 demonstrates two possible embodiments of the invention wherein the receiving stations may have either of the two forms shown for the remote receiving stations 16 and 18. If all of the receiving stations have the form of the station 16, then the switch 76 may be placed in the position for connection of the line 80 to the combiner 70, in which case the transmitter 74 transmits a normal television signal while the instructional signal is transmitted by the transmitter 72. In the event that all of the receiving stations are in the form of the station 18 then the switch 76 connects a line 78 to the combiner 70 for providing a modified form of the transmitted television signal wherein the instructional signal is included within the television signal. In such case, the radio transmitter 72 is not used by the invention, but may, nevertheless, transmit a radio program to remote radios which do not form a part of the system of the invention.

The television system 28 comprises a receiver 82, a demodulator 84, and a speaker 86. The separation circuitry 30 comprises a narrow-band filter 88 and a demodulator 90. The passband of the filter 88 is equal to the bandwidth of the instructional signal shown in FIG. 2.

In the operation of the receiving station 16, the receiver 40 functions in the manner of a well-known radio receiver for receiving the radio transmission incident upon the antenna 36. In addition, the receiver 40 includes a narrow-band filter 92 having a passband equal to that of the filter 88. Thereby, the filter 92 extracts from the audio spectrum the portion of the spectrum, shown in FIG. 2 designated for the instructional signal. The signal outputted by the filter 92 is demodulated by the demodulator 42 to recover the digitally formatted signal produced by the encoder 60, which digitally formatted signal is applied to the response unit 22 for providing instruction thereto. The television set 38 in the receiving station 16, as noted hereinabove, functions in accordance with the well-known form of television set outputting both audio and video signals, the latter appearing on the screen 20.

In the operation of the receiving station 18, the receiver 82 includes a well-known television tuner (not shown) and outputs the television signal of the channel to which the receiver 82 is tuned. The television signal outputted by the receiver 82 is demodulated in a well-known fashion by the demodulator 84 to provide a video signal which is presented on the television screen 20, and an audio signal which is presented by the speaker 86.

In accordance with a feature of the invention the demodulator 84 also applies an audio signal to the filter 88 of the separation circuitry 30. The filter 88 extracts the portion of the audio spectrum designated for the instructional signal, as does the filter 92, and outputs the instructional signal to the demodulator 90. The demodulator 90 operates, as does the demodulator 42 to recover the digitally formatted signal produced by the encoder 60, which digitally formatted signal is applied to the response unit 22 to provide instruction thereto. Thereby, the response units 22 of the receiving stations 16 and 18 are able to function concurrently with the presentation of the broadcast television program upon the television screens 20. As indicated in the drawing for the receiving station 18, a member of the normally remote audience 94 operates the keyboard 44 of the response unit 22 while listening to the speaker 86 and watching the television screen 20.

Figure 4:
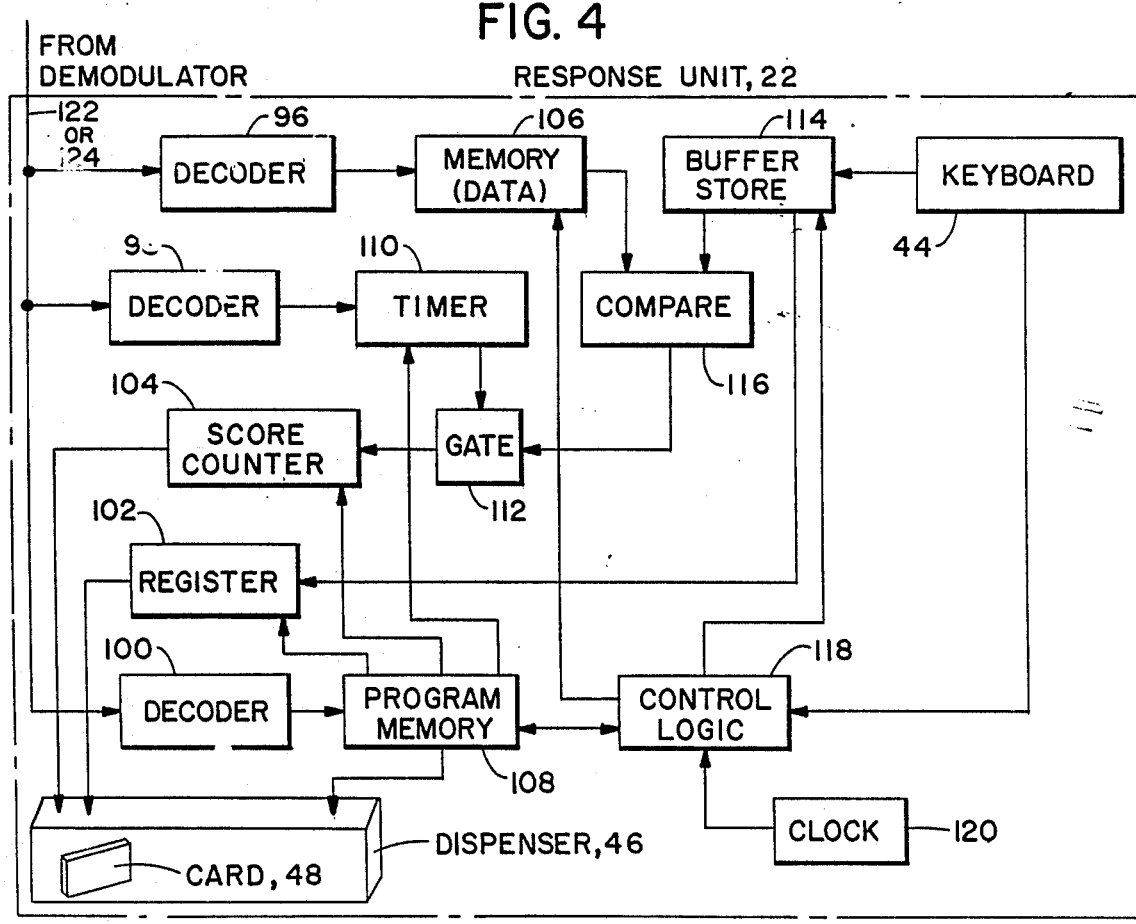
FIG. 4 is a block diagram of an electronic response unit in each remote receiving station of FIGS. 1 and 3.

With reference to FIG. 4, there is shown one embodiment of the response unit 22. The circuitry shown therein accomplishes the major functions of the response unit 22, namely, providing a member of the audience 94 with a means for entering a response to a situation viewed on the television screen 20 and/or heard via the speaker 86, not accepting (rejecting) or accepting, evaluating and scoring such response, recording such response, and outputting a temporary or permanent record of the response. In particular, it can be advantageous if the permanent record is in the form of the card 48, which form is machine readable to facilitate a reading of the score and/or response by either a third party or the host 50. It is to be understood that the circuitry of FIG. 4 constitutes only one possible embodiment of the invention for performing these functions and that other embodiments employing a digital computer suitably programmed (not shown) may also be employed.

The response unit 22 comprises three decoders 96, 98, and 100, a register 102, a score counter 104, a memory 106 for storing data, and a memory 108 for storing an operating program, a timer 110, a gate 112, a buffer store 114, a comparator 116 for comparing output signals of the store 114 with the memory 106, a logic unit 118, and a clock 120, these components being in addition to the keyboard 44 and the dispenser 46 disclosed previously with reference to FIGS. 1 and 3.

In operation, the memory 106 stores data with respect to the answers which are to be provided by the viewing audience. For example, in the event that the viewing audience is composed of children in a children's show wherein children are learning to identify colors, the host may point successively to a red hat, a blue table, and a green car and request to know the colors of the respective objects. In such case, the memory 106 would store response criteria, in this instance, the words red, blue, and green in the sequence corresponding to the order in which the objects are to be addressed by the host. The keys on the keyboard 44 may be similarly colored to enable entry of the correct response. Alternatively, for older children, the keyboard may be an alphanumeric keyboard, as is found on a typewriter, in which case the viewing audience is to type the words corresponding to the colors addressed by the host. In this case, the comparator 116 would compare the spelling of the words entered via the keyboard 44 with the spelling of the colors stored in the memory 106. The buffer store 114 stores the responses entered via the keyboard 44 to enable the comparator 116 to compare the response with the data stored in the memory 106.

The method and system of the invention lend themselves particularly well to educational shows for children. Questions pertaining to educational toys, to books, to stories and to subjects being taught or addressed, are interspersed in the show. Children are rewarded with tokens or other forms of award, such as coupons redeemable at candy stores, ice cream parlors, and the like.

The score counter 104 operates under command from the program memory 108 to score each correct response signal outputted by the comparator 116. When the response entered at the keyboard 44 agrees with the data stored in the memory 106, the comparator 116 outputs a logic-1 signal via gate 112 to the counter 104. The output signal of the comparator 116 serves as an enable signal to initiate a count by the counter 104. The counter increments its count by 1, 2, 3, or other amount depending on the magnitude of the score to be awarded for the correct response. In the event that the response is to be timed in the sense that a limited time is available for the response, then the timer 110 is activated by the program memory 108 to render the gate 112 in a state of conduction of signals of the comparator 116 only during the interval of time when the response is permitted. Both before and after this interval of time, the timer 110 places the gate 112 in a state of nonconduction so that a response entered at the keyboard 44 outside of the desired response interval, or "window", cannot enable the counter 104 to increment or modify the score.

The output count, score, or evaluation of the counter 104 is applied to the dispenser 46 which includes a recording medium, such as the card 48, for providing a permanent record of the score. The dispenser 46 includes suitable magnetic recording heads (not shown) for recording information on the card 48 in a well known fashion. In addition, if desired, the dispenser 46 may include well-known encryption circuitry for recording the score on the card 48 in a fashion which cannot be read except by an automatic card reader having circuitry for decrypting the recorded message. The dispenser 46 is activated by the program memory 108 to accomplish the foregoing recording of the score.

The score counter/evaluator 104 can take different forms. While the score counting function is described herein for illustrative purposes, it should be understood that unit 104 may be designed to perform the processing of data entered by respondents on keyboard 44 or other data entering device. Included in such processing are, for instance, the computerized processing of data provided by respondents in accordance with one of several programs stored in memory 108 and brought into play by the instructional or command signals transmitted by transmitters 72 or 74. Questionnaires or forms used in market research may be stored in dispenser 46 or may be placed into it by respondents. Following a set of questions, or upon the completion of the broadcast, processed or unprocessed data are issued by dispenser 46 in the form of hard copy taking the form of one of the embodiments described.

If desired, the actual response entered at the keyboard 44, such as the words red, blue, and green of the foregoing example, may be recorded by the dispenser 46. For this purpose, the responses are coupled from the buffer store 114 to a register 102 wherein the responses are stored prior to recording at the dispenser 46. After all of the responses have been stored in the register 102, the program memory 108 strobes the register 102 to pass the data of the responses into the dispenser 46 for recordation upon the card 48 or such other form of storage media as may be employed.

The printout mechanism or marking device may take different forms to meet the requirements of the broadcast, whether quiz programs, educational programs, tests surveys or other task setting assignments. These devices may be relatively small, utilizing a continuous tape as the substrate to which the markings are applied, or they may utilize full page printouts. The recording medium may be a special form or blank dispensed individually by the device as a cut section, or may take other, discontinuous shapes.

Although completely blank forms may be used in recording respondents' entries in the data entering device, in many instances the forms or blanks preferably are provided with lines, grids or matrices for easier subsequent scoring of responses recorded on such forms or blanks.

To prevent tampering, forging and counterfeiting, the recording medium may comprise material, such as paper or cardboard stock, plastic and the like, of special composition or containing admixtures of identifiable substances facilitating recognition by electronic or other sensing and scanning devices. Verification may also be facilitated by using recording media that are colored, coated, embossed, textured, magnetized or otherwise given recognizable properties.

By replacing the recording media, such as rolls of paper tape, periodically, and by stipulating redemption of the record thus created within a specified time period, the unauthorized reproduction, tampering with and counterfeiting of the marked recording media can, for all practical purposes, be prevented.

The marking may be applied by any known methods, including printing with or without impact, using ink sprays, heat, magnetic pulses, laser beams and other light sources. The markings may also take the form of depressions and embossed configurations legible by appropriate devices.

In addition, to prevent tampering, the recording mechanism, such as a printer, can be provided with means for alternatively and selectively applying one of a plurality of different types of markings. As an example, the color, intensity, width, spacing, positioning, font and resolution of the markings may be built into the recording means and may be controlled by radio or other electronic command signals from a central station.

The shape and configuration of the markings to be utilized at any particular time and subject to change at any time, includes numbers, letters, dots, dashes, regular and irregular shapes, codes, symbols and other configurations, which may be discrete, connected or continuous. The markings may also comprise shapes and configurations having no discernible pattern and readable only by appropriate scanning, reading or decoding means.

The number of combinations and permutations of the above mentioned properties of the recording media and markings is so large as practically to preclude tampering, forging, altering, counterfeiting or reproduction of authentic records; the unauthorized manufacture of special composition paper alone, would be far too costly and particularly time consuming to be practical.

If magnetized cards are used and validated by dispenser, the validation may be erased at the time a card is presented for redemption, so that it may be re-used.

It is noted that the data to be stored in the memory 106 is provided by the instruction signal on line 122 or 124 from the demodulators of the receiving stations 16 or 18. The digital format of the instructional signal is decoded by the decoder 96 to extract the portion of the signal relating to the data which is to be stored in memory 106. The decoder 98 decodes that portion of the signal which is to be employed for presetting the timer 110 for the designated interval of response time. The decoder 100 decodes that portion of the instruction signal which presets the memory 108 to any one of a number of previously stored formats for responding to situations presented in the studio 14. In this regard, it is noted that the form of the instructional signal follows common communication practice wherein the instructional signal is set up as a sequence of digital words or fields which identify respective portions of the message dealing with data, timing interval, and program commands. Thereby, the decoders 96, 98 and 100 are able to recognize the specific parts of the instructional signal and to extract the requisite data and commands.

The control logic 118 operates in response to a succession of clock pulses provided by the clock pulses provided provided by the clock 120 for outputting control function signals to the memories 106 and 108 and to the buffer store 114. A connection between the keyboard 44 and the logic unit 118 provides for a control function, such as an entry command whereby a person responding directs the store 114 to enter the data inputted by the keyboard 44. The control logic of the unit 118 may also be activated by a command from the program memory 108. Thereby, the response unit 22 is capable of receiving, scoring, and recording a response entered by a member of the audience at a remote receiving station.

The construction of the foregoing system of the invention permits its use in numerous situations involving participation wherein members in the external home-shopping audience are to participate with members of the studio audience in situations requiring participation. An example of the utility of the system may be demonstrated by considering a combined television home-shopping and game/quiz show involving both people at home as well as in the studio. The invention makes it possible to broadcast such a combined show permitting home viewers to become participants and contestants. The invention is applicable to a variety of present and future game shows.

As an illustration, the quiz portion of a program may include the task of listing, in reverse chronological order, the names of all teams having won the baseball World Series, or the World Soccer Championship. A time limit is set which makes it impossible for contestants to enter all correct answers; this is common practice in aptitude tests.

There are five contestants on the studio stage. Each studio contestant is equipped with well known means to write, print, type or otherwise enter his or her response on a board, keyboard or other data entering device adapted so that the responses, in the process of being entered, may be projected on a screen or screens visible to the studio audience, but not to the contestants and not to the home viewers until the predetermined time limit has been reached, or until the time allowed has substantially been consumed. The responses of studio contestants can be displayed to the studio audience and to home viewers with some delay, thereby preventing any of the home contestants from benefiting from the answers of the stage contestants.

It therefore is an object of the system described to elicit responses from contestants at remote sites and to capture their responses in their data entering devices essentially before the responses given by stage or studio contestants become known to home contestants. This is accomplished by projecting the questions on a screen hidden from studio contestants but in view of the camera 54. Concurrently with, or prior to the projection of the questions, the host 50 employs the keyboard 58 to transmit instructions to the response units 22 of the remote audience. The response entered by a participant in the remote audience is timed and is subject to a time limit, the time period to conclude before the questions are presented to the studio contestants. Thereby, the responses of the remote audience are not influenced by the responses of the studio contestants. Keyboard 58 may be operated by a person other than the quiz show host and may be situated on-stage or off-stage.

In a simple version, the system can be employed to attract viewers and listeners not normally disposed to participate in game or quiz shows per se, but willing to answer a few unobtrusive questions, especially if pertaining to a subject of interest to the viewer. By responding to questions, a home viewer can, in effect, act as a contestant. The questions to be answered by home viewers and radio listeners can be interspersed in shows other than quiz shows and can be so simple as to require essentially only a confirmation by participants of being tuned in to a particular program.

Thus, for instance, home participants may be asked to identify the soap opera character who earlier appeared in the program. Or home viewers of a sports program may be asked to name a player who just scored. These implementations of the system and accompanying awards to a correct answer are intended to increase the television and radio audience. Viewers of a soap opera or persons listening to a radio sports broadcast, constitute a highly targeted audience and as a result of the lower per-household cost, advertisers will be able to award more valuable coupons and prizes to successful respondents. Participants who have given an acceptable answer can be rewarded with a coupon of defined value to be redeemed in cash, or to be applied to the price of a specified product or to the price of any product in a specified retail outlet. Other forms of rewards, whether of commercial or symbolic value, may be devised.

The quantitative results obtained by this method can also be used in the statistical analysis and the reactions of audiences tuned in to certain programs. It is noted that the equipment of the invention may well be installed in numerous selected or random households in which case, responses by household members can readily serve as a bases for statistically sampling peoples' responses to a product, service, political candidates, corporate images and other subjects of surveys. The increased audience provided by the invention is significant in survey and market research fields because, by way of example, an increase of sample size from 2000 to 2 million will reduce a sampling error from 3% to 0.1%.

In the field of qualitative market analysis and consumer research, the system and methods described can be employed very effectively, substituting home viewers and listeners for the so-called focus groups or other population samples used to determine buyer responses to products and services. The versatility and flexibility of the home keyboard or other data entering device are particularly well suited to the elicitation of unbiased responses to questions or statements by advertising agencies and market analysts. The market research and other surveys and polls made possible by the system and methods described, can be part of a regular quiz show or can can be conducted separately. Respondents are rewarded for their cooperation by issuing certificates, coupons and the like to them. The permanent records produced by the dispensing means in remote locations can be mailed to the research organization. For this purpose the forms dispensed by the dispensers in participants' homes can take the form of self-addressed return envelopes. Special printed forms may be used in conducting research into respondents' reactions to tasks or questions. Coupon awards may be dispensed separately or may be a tear-off section of a survey form.

For the implementation of game/quiz shows, the following advantages of the invention are noted. The system of the invention does not require any wiring or rewiring of a home nor the use of telephone lines, and may be offered to viewers free of charge. A telephone is suggested merely as a convenient and rapid means for interaction between respondent and host, but is not required to practice the invention. For example, the external audience might be located in a separate room within walking distance from the studio in which case interaction can be accomplished personally by allowing a member of the external audience to walk over to the studio. The system permits home viewers to participate in quiz shows on the spur of the moment without advance notice and without any requirement for special forms or entry blanks. The system can be superposed upon a variety of game and quiz shows to permit viewer participation without interference with existing show formats, and has the advantage of expanding the television audience, thereby attracting sponsors of the shows. The machine readable card 48, or a one-time coupon which may be outputted by the dispenser 46, may be presented or redeemed for prizes by successful participants at a local store or other business establishment cooperating with the broadcaster.

The system provides simplicity in the administration of the game by identification of the successful respondents; this is readily accomplished at the dispenser 46 in each remote location by imprinting each card 48 or token with the name of the respondent. In particular, if desired, the name of the respondent can be inputted at the keyboard 44 as are other answers to questions. The questions may include multiple-part questions and may require multiple choice answers, if desired. The questions may require simple answers such as yes or no, a single word such as a number or a color, or a plurality of words as in a phrase or narrative. Operation of the score counter 104 for various choices of answer permit a scoring of partially correct responses and those meeting a predetermined response criteria. In its simplest form, the keyboard may be provided with only two keys to answer yes or no, while in a more complex form, the keyboard may include the alphanumeric character keys for entering words or phrases.

If, as an example, a respondent must select a number from the numbers 1 through 9, and if the completely accurate answer is 5, the comparator unit may be programmed so as to accept any number between 4 and 6, or 3 and 6, etc.

By way of alternative embodiments to the invention, it is noted that the comparator 116 may output a multiple-bit digital word wherein the additional bits are provided by the memory 106 dependent on t he specific answer stored in the memory 106, which answer is compared to the response within the buffer store 114. For example, if two possible responses would be regarded as correct, but one of the two responses is preferred, then the comparator 116 would output an additional bit for the preferred response. The additional bit would be passed by the gate 112 to advance the count of the counter 104, thereby to increase the score by a larger amount when the preferred response is entered at the keyboard 44.

The formatting and reformatting can provide for various ways of weighting the responses of home contestants, such as straight line additions, geometric and exponential progressions, or computations of scores based on formulas incorporating discrete groups of responses. Thus, score counter 104 may be replaced with a microcomputer (not shown) which is responsive to commands from the memory 108 for combining inputs from keyboard 44, memories 106 and 108, and capable of reflecting the time element, to serve, in effect, as an evaluator of complex answers.

According to the present invention, questions may be transmitted from the central station, to which more than one acceptable answer may be given, the answers varying in the degree of difficulty from the respondent's standpoint. As an example, a question may call for naming a minimum of two European cities, the names beginning with the letter M, this being difficulty level 1. Difficulty level 2 might call for four such cities and difficulty level 3 might call for six such cities, all answers to be entered within 30 seconds. The particular difficulty level may by specified by the person controlling the transmission, or it may be selected by the individual respondent prior to seeing or hearing the question. In order to enable a contestant to choose a difficulty level, the host may announce or hint at the general nature or the context of the question about to be asked. The degree of difficulty will normally determine the value of the prize, etc. The device evaluating the responses may dispense records, e.g. coupons, certificates and the like of different value or in different denominations. For instance, it may issue a 10 cent coupon at level 1, and 25 cent coupon at level 2, and a 50 cent coupon at level 3. The coupons may be redeemed in retail establishments, the coupons being similar to those contained in newspapers. It should be understood, therefore, that in addition to the difficulty level set by the host, a higher difficulty level may be superimposed by an individual contestant, as will be disclosed subsequently with reference to FIGS. 6-10.

By use of encryption, the card 48 provides an essentially tamper-proof record. The invention is applicable, not only to home viewers but also to viewers in a public establishment such as a restaurant or school wherein people may participate as teams. The questions may be gradated to be suitable for a variety of audiences varying from those having limited formal education to those having special interests. By use of the timer 110, the studio host can designate the beginning and end of a response interval, and vary the time limit allowed from question to question. In addition, the invention lends itself to the development of further forms of game and quiz shows. The difficulty level can be increased by decreasing an allocated time for response.

As an example in the use of the invention in the educational field, the memories of the response units at the remote locations receive and retain instructional signals from a central transmitting station conveying the correct, preferred, or acceptable response or responses to the task posed by the task-setting message. Upon completion of a task by a respondent, or upon lapsing of the allotted time, the printout mechanism is activated by the instructional signals so as to communicate or so as to dispense in hard copy form the correct or preferred response to each respondent at remote locations. In this manner, a student who receives a printout containing his or her scored response, also receives the "textbook" solution or most desirable response to the task presented. For comparison purposes, the dispenser may provide printed hard copy containing a student's original response.

The foregoing features in the operation of the system of the invention are readily applied to the educational field to encourage both early educational experiences among children as well as for home-study courses for high school and university students. In the educational field, the situation portrayed in the studio and presented on the television screen may be in the nature of a task-setting situation rather than that of a pure question. The appropriate response be a brief statement, an equation, or may contain a number of cross-referenced key words or key phrases or symbols. The system of the invention may be implemented also by closed circuit television and cable television as well as by the broadcast situation of FIG. 1. The keyboard 44 at each of the response units 22 may be a standard typewriter keyboard, as noted above, or may include a display of the typed response such as is presently available on some electronic typewriters.

Such a display would be useful in the answering of examination questions for home-study programs. It is also noted that the keyboard 44 is representative of a response entry device, and may, if desired, be replaced by other entry devices such as a joystick, switches, or a device responsive to a spoken voice.

Response evaluation means referred to herein may include, when appropriate, as for example in the educational field, scanning devices capable of recognizing symbols, diagrams, charts, formulas, equations and drawings responsive to the response criteria.

In the practice of the invention, the answers given by studio contestants may, for instance, be displayed to the studio audience and/or broadcast to TV-viewers following a predetermined delay of, say 5-20 seconds. During this 5-20 second period, the data or response entering devices of the stage contestants, or the studio display devices, may be made inoperative, so that no answers may be entered and/or displayed, even if the stage contestants are aware of the questions. Other ways of staggering the "response windows" by 5-20 seconds or more can be devised.

This time lag is intended to make the answers projected on studio screens following the time lag useless to home contestants from the point of view of total time allowed for response. By the time the correct answers are televised, all or a critical amount of the allotted time will have elapsed. This forces home contestants to enter their responses before knowing the responses of studio contestants.

By way of example only, a typical sequence of events as pertaining to a quiz show with studio and home contestants is as follows: TV home viewers and contestants see and hear the questions without delay. However, the questions are presented to stage contestants and the studio audience after a delay of 5-20 seconds. The respective contestants may begin answering questions upon their presentation, subject to time limits. Acceptable responses are presented to everyone, only after the stage contestants have completed their time for response.

To provide attention-attracting action on stage for the studio audience and TV-viewers who are not contestants, the announcer or master of ceremonies can set the stage for the questions, or he can read the questions to the stage contestants and the audience, thereby, consuming 5-20 seconds. The questions are displayed on a screen, visible to all TV-viewers, including home contestants. Other ways of giving home contestants a head start of 5-20 seconds, or more, can be devised. In another embodiment, the responses by stage contestants are entered, but not displayed for a predetermined period of time. Home contestants may be allotted more or less time than studio participants. If there is only one participant or contestant on stage, the quiz show still follows the concept outlined.

As an example, the use of key words and key phrases is illustrated in the context of a game show described hereinafter, which might be entitled "Definitions". the host presents a situation, hints at, or announces a dictionary word and defines the task as one of providing the correct definition or definitions of such word. The dictionary definition, frequently a phrase, is of course an acceptable answer. Using the task word "many" as an example, an indispensable key work that would have to appear in any acceptable response would be the word "number". However, two or more definitions may exist for a task word.

It will be obvious that this type of show lends itself well to evaluating partially correct and less-than-exhaustive responses. Partial credit may be given to definitions that are reasonably close to the dictionary definition. A more complex task in the context of said show might be the definition of the word "set", for which a large number of definitions exist. Cumulative credits may be awarded to contestants listing a plurality of key definition words or phrases.

According to another show format, separate quiz programs for studio contestants and home contestants may be conducted concurrently by the same game show host. He may, for instance, conduct one quiz program for studio contestants in the manner described and while the studio contestants ponder their answers may present supplemental, or a separate set of, questions to home contestants, to which the latter respond in accordance with the method of the present invention. Such separate questions for home contestants may be posed by a second or off-stage announcer.

In the United States, Europe and other regions, television programs are frequently broadcast repetitively in different time zones. In the case of game shows, this enables television viewers who are tuned in to such program and who are in a time zone which first receives one such game or quiz show to inform members of an audience in another time zone of the correct responses to tasks or questions, thus ensuring such members in other time zones of winning an award without having independently correctly responded to such tasks. This potential problem resulting from a sequential broadcasting of television game shows in the context of the present invention will now be addressed.

When the awards offered successful contestants are of a monetary value representing, say 10-15 percent of the price of the merchandise, and are designed only to attract buyers to a store, then a sponsor, such as a manufacturer, may choose to ignore the risk of, or may even welcome, having members of an audience in a first time zone provide members in a later time zone, who themselves did not think of the correct answer, with an appropriate response. Awarding such viewer a 10 percent discount is similar to making 10 percent discount coupons available through newspapers and magazines.

A more serious problem may arise when a sponsor or manufacturer offers awards of a larger magnitude. In such instances, it is desirable to employ a method, and such methods are hereinafter described, which permit airing a quiz or educational program presenting tasks or questions calling for different responses in different time zones. This is achieved by a modified version of the methods described above, which modified methods may be practiced with the systems described in this specification and accompanying drawings.

For example, a host or professor may stand in front of a map of the world. He or she poses the question "In which country is the river to which I am pointing located?" For purposes of this illustration, the audio portion of the question is referred to herein as a "module question", and normally a quiz show or educational program comprises many such module questions. The object of formulating module questions is to be able easily and economically to substitute such module questions for each other in the same show, which normally is taped prior to airing. Such a module question, consisting of the audio portion of the question can easily and economically be replaced by another audio portion, while the more costly video portion (the host pointing to a map) remains the same.

In such a modified method, a part of all of a question or task presented in a program in one time zone, are differentiated and are different from the corresponding question or task asked in a similar program aired in another time one. This is achieved by formulating at least a part of a question or task in interchangeable module form.

Either an entire question may be substituted in a program, or a part of a question may be substituted. If only a part of a question is to be substituted, such part can for instance be a part or all of only the video portion of a question. Normally, such interchangeable module questions will be of approximately the same length, so as not to affect the overall length of a program.

If a program comprises an entertainment portion and a game or quiz show portion, the part of the show consisting of questions or tasks may be produced and taped separately and independently of the entertainment of other portions of the show. Many forms of implementation of this method may be devised. The example given below is illustrative of only one of the alternative methods which achieve the above mentioned object.

According to a preferred method, a plurality of sets of different tasks is formulated, using one set of tasks in one time zone and another set of tasks in another time zone. Although the tasks may differ in their entirety, a preferred method is described wherein the tasks differ only with respect to their audio portion.

In the taping of the show, the video portion is the same in all tapes, irrespective of the time zone in which such program is to be aired or transmitted by cable. The audio and video portions together form a question or task. The audio portions of module questions change from one such program to the next. Thus the host or professor is seen in all versions of the show to be pointing to the same map. He or she will, however, tape a plurality of oral module questions, only one of these module questions being used in any one time zone. With reference to the above example, in which a host points to a map of the world, another module question may be "What is the name of the river?" Yet another such module question by the host may be "Is the river to which I am pointing among the five longest rivers in the world?"

The above described example involves the same host or professor asking a set of questions, each of which questions must be taped in its entirety. This necessitates the involvement of the host in asking a set of successive oral questions, while the video portion remains the same. In another version of this preferred method, the module questions, that is the audio portions of each question, are asked by an off-camera announcer. This method has the advantage that in the taping of the show, the host spends only sufficient time in front of the camera to ask one question, the host providing such action in front of the camera as is required to make the oral module question asked by the off-camera announcer intelligible. Thus, the host may silently point to an object, such as a map, for a length of time permitting an off-camera announcer to pose one module question. Other module questions asked by the off-camera announcer and accompanying the same video portion showing the host, are dubbed or inserted into the appropriate part of the tape. In the taping of a quiz show intended to be aired in four time zones, an off-camera announcer therefore asks four sets of module questions, one set of these oral questions being inserted into the appropriate place in each of the four program tapes used in transmitting the show in the four time zones.

Yet another example of a simplified version of the above methods may entail a projection of a scene or the filming of an object without a host being present. The object could be a well-known personality, or a picture of such personality; or an action shot of such personality may be used. An off-camera announcer may ask a number of oral or module questions to meet the requirements of the number of shows to the shown in different time zones.

The examples set forth are simple ones and many different and more complex versions and implementations of the home quiz show are possible and will occur to game show producers.

In some instances, such as in market research, the system described can be employed to identify consumers meeting certain criteria. In that event, the memory and control elements of response unit 22 are programmed in accordance with the requirements of the particular consumer research. Response unit 22 normally is placed in remote locations, which need not be homes and can be other private and public places. In an alternative application of the system, the response unit 22 is equipped with appropriate means capable of limiting the functions of the scoring and evaluation means. For this purpose, controls and switches (not shown) are provided, which cause memories 106 and 108, logic control 118, comparator 116 and gate 112 to selectively perform only those evaluating functions required for the specific application. In such an event, dispenser 46 receives only partially processed data and generates a record of responses entered on keyboard 44 reflecting responses evaluated only to the desired extent and resembling the original information entered by respondents. Respondents are rewarded in one of the manners previously described.

It is a particular advantage of the present system that the kind of data-entering device may vary between different remote locations. Furthermore, the kind of data entering, scoring or evaluating device installed at different locations may vary in accordance with the intended use. Thus, for instance, in selected remote locations, electronic devices of known design may be installed, which are capable of subjecting the raw data entered by respondents to computer analysis.

The invention may be practiced by providing two or more response units at each remote location together with one set of program presenting means. Providing more than one response unit, including means to modify a difficulty level and timing, and including comparison, storing, scoring and dispensing means in, for example, one household, enables two or more family members to become contestants by responding individually to a situation presented by a single television or radio receiver based on a program transmission from a central station. In a public place, a plurality of response units will generate increased and competitive participation by persons present.

Figure 5:
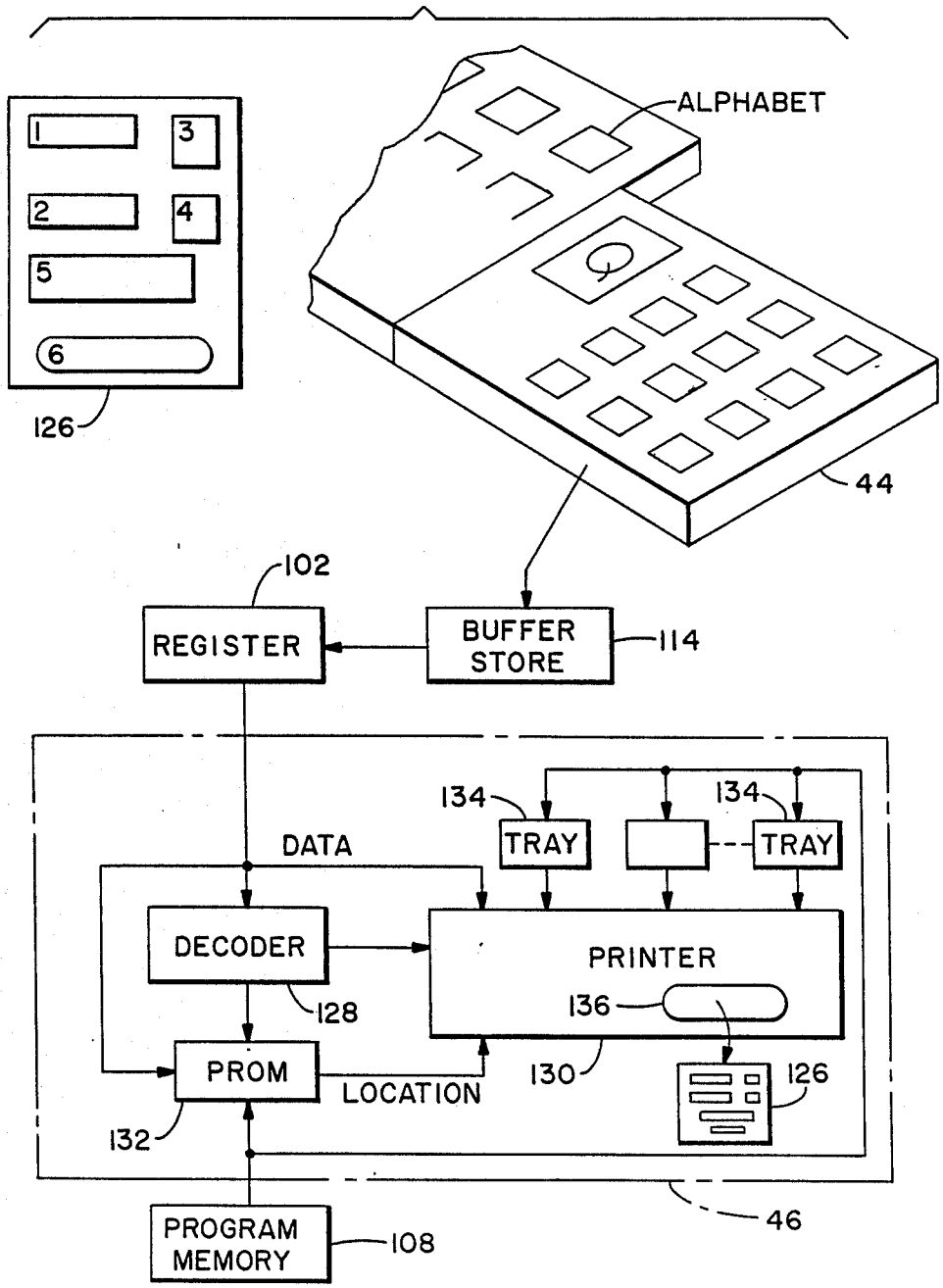
FIG. 5 is a block diagram showing details of a dispenser of FIG. 4.

FIG. 5 shows the buffer store 114, the register 102 and the program memory 108, as well as further details of the dispenser 46 of FIG. 4 to accomplish the imprinting of a response on a recording medium, such as a paper or card, having a prescribed format for the entry of answers. As has been noted hereinabove, such a data entry form or questionnaire, is useful for providing responses by respondents in situations such as contests, educational and advertising promotional or research activities. An example of such a questionnaire 126 is shown in FIG. 5. Therein, blocks numbered 1-6 are provided for entry of responses by members of the audience at the remote receiving stations 16 and 18.

Also shown in FIG. 5 is an enlarged fragmentary view of the keyboard 44, the view showing a keypad with keys for the entry of identifying numerals for identifying the blocks of the questionnaire 126 in which the respective answers are to be entered. The respondent identifies a questionnaire block by holding down a control key Q while typing the identifying numeral on the keyboard 44. The response to be entered in that block is then typed by use of the alphabet keys of the keyboard 44.

The dispenser 46 comprises a decoder 128, a printer 130 and a programmable read-only memory (PROM) 132. In operation, the typed answer and the questionnaire block identification is applied by the keyboard 44 and via the store 114 to the register 102. The contents of the register 102, as described hereinabove, are subsequently transferred to the dispenser 46. The decoder 128 detects the presence of a digital word produced by the control key Q, and thereby decodes the incoming digital signals from the register 102 so as to separate the block identification from the response. The decoder 128 activates the printer 130, upon the appearance of the response, to print the response on the questionnaire 126, the latter having been previously placed into the dispenser 46 by the respondent. The decoder also addresses the PROM 132 with the block identification, whereupon the PROM 132 outputs the block location to the printer 130 to direct the printer 130 to print the response at the correct location on the questionnaire 126. Information with respect to the layout of the questionnaire 126 is loaded into the PROM 132 by the program memory 108 as directed by the instructional signal on line 122 or 124 of FIG. 4.

Alternatively, the block location data and the responses may be stored on the card 48 for printing out at another location, such as the facilities of an advertiser or a company providing the promotional activities. The response may include a narrative text, in which case the comparator 116 may be employed to signal the presence of key words in the response, which have been previously entered into the data memory 106.

By way of further embodiments of the invention, it is noted that the dispenser 46 may include a group of trays 134 each of which stores a separate set of forms such as the questionnaire 126 upon which a response is to be printed. The trays 134 are activated by a control signal from the program memory 108 to present a blank form to the printer 130 to be imprinted with the response. Information with respect to the desired form to be employed in response to a task-setting situation is loaded into the program memory 108 by the instructional signal on line 122 or 124, whereby an instructor or the host 50 in a classroom or in the studio 14 designates the requisite form for use in preparing the response. The completed form, or questionnaire 126, exits a slot 136 of the printer 130. The completed questionnaire 126 may be provided on any suitable recording medium which serves as a hard copy such as paper, plastic strip, or plastic card.

As was shown with respect to FIG. 4, the score counter 104 is under control of the program memory 108. This permits the score counter 104 to be activated and deactivated by commands transmitted via the instructional signal. In the outputting of the foregoing questionnaire 126 from the printer 130 with words printed in the appropriate blocks, a score can also be imprinted upon the questionnaire 126 upon activation of the counter 104, which score is omitted upon deactivation of the counter 104.

At the discretion of the television program conductor and that of individual viewers, different difficulty levels may be applied to individual questions, it being understood that answers to more difficult questions or answers to the same questions at higher difficulty level may carry with them larger awards. However, even if only one set of response criteria is established for a task, it is understood that such response criteria carry a specified difficulty level. Each successful respondent may be issued a printout or similar hard copy displaying the value of the award and containing a code which is verifiable over the telephone by a central station, or without the use of a telephone, by a cooperating store or merchandising center, for issuing an award.

Figure 6:
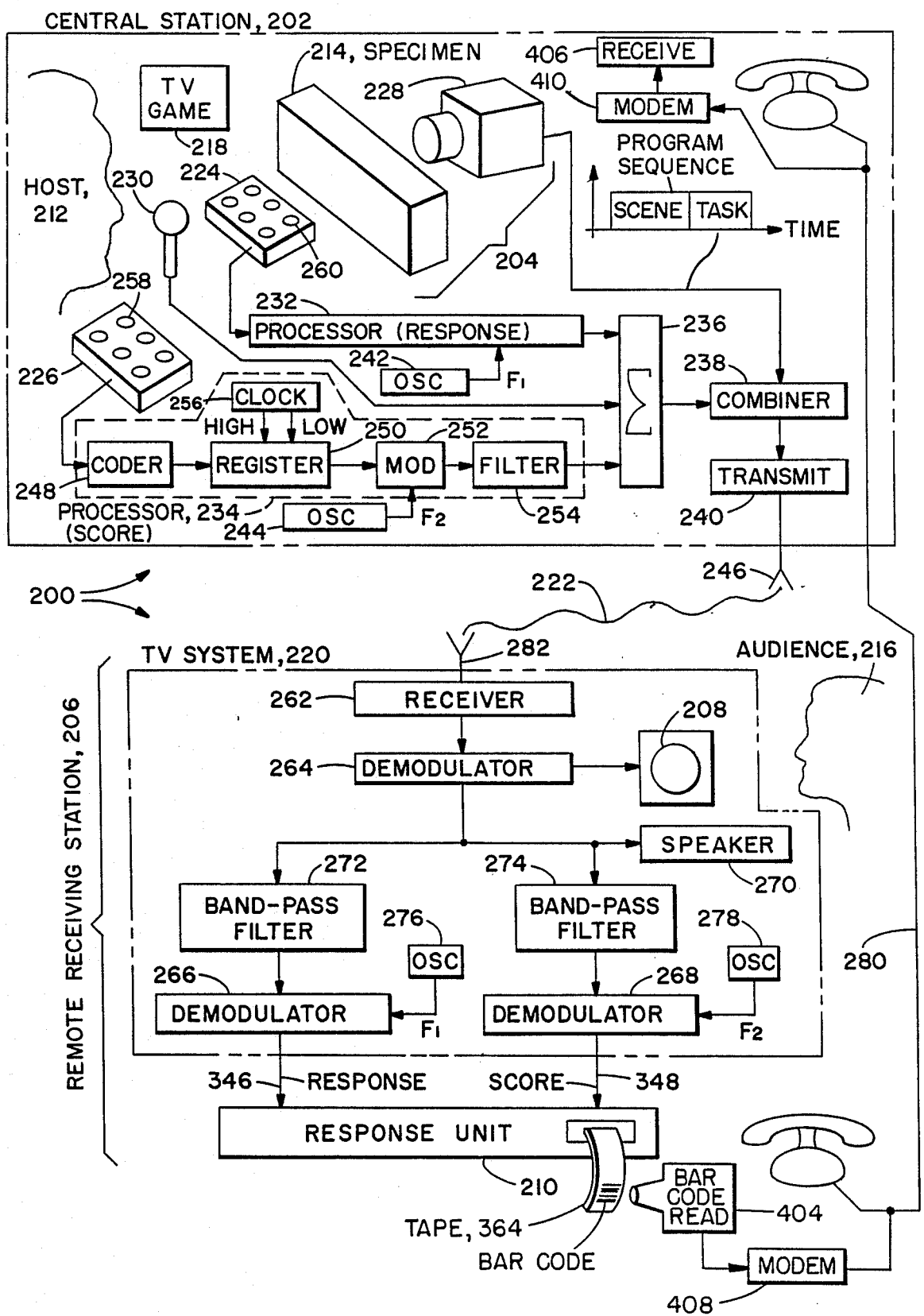
FIG. 6 shows an embodiment of the invention, similar to that of FIG. 3, the system of FIG. 6 employing the transmission of two signal groups each having plural sets of signals, wherein first and second signals of the first signal group are transmitted by video and audio portions of a television program, the first and the second signals presenting respectively a studio scene and a task for respondents, and wherein two sets of signals of the second group, an instructional group, are combined with an audio signal of the first group.

FIG. 6 shows a further embodiment of the invention having greater versatility in the evaluation of learning situations and the scoring of games and contests by means of a system 200. In the system 200, a central station 202 includes a studio 204, such as a television studio, and broadcasts programs to many remote receiving stations, one such station 206 being shown by way of example. Each of the receiving stations 206 includes means, such as a television screen 208, for observing a broadcast program, and means by which persons in a remote viewing audience can respond to situations presented in the studio 204. The response means is shown as a response unit 210 which, as will be described hereinafter, includes circuitry for evaluating and recording responses entered by persons in the viewing audience.

A television program is conducted in the studio 204 by a host 212. While various types of programs may be employed in conjunction with the study of specific subject matter, for example, a course in advertising or packaging, in which there is a display of a specimen 214 of merchandise, or other subject of interest, to members of a remote television audience 216 located at the remote receiving stations 206, a game program employing a television game 218 is presented by way of illustration of the invention. The use of a game is a recognized technique in the teaching of children, as well as older persons, in a classroom. The specimen 214 might be an article, such as furniture or clothing, normally offered for sale, or other type of object such as a painting or animal in the case of study of such subject matter. For example, in a study of architecture, the "specimen" would be a model of a building, and in a home-study course of geography, the "specimen" would be a map or other teaching aid. In the case of services being offered, the specimen may take the form of an advertisement of such services. Each receiving station 206 is provided with a television system 220 which receives broadcast transmissions 222 of the televised game show for presentation on the television screen 208.

In the studio 204, the host 212, or an associate who may be off-camera, is provided with two keyboards 224 and 226, respectively, for entering appropriate responses to situations posed by the game 218 (response criteria) and for entering appropriate guidelines for scoring the responses (scoring mode). The game 218 and the specimen 214 are viewed by a television camera 228 which provides video signals for the broadcast transmission 222. It is to be understood that, in addition to the remote audience 216, a local or studio audience (not shown) may be present within the studio 204 for participating in the game 218. The host 212 addresses the local audience and the remote audience by means of a microphone 230, the microphone 230 providing an audio signal for the broadcast transmission 222. In this example of the television game, a video signal is transmitted to the remote audience to present a picture of of the game situation, this signal being followed by an audio signal in which the host describes the task to be performed by the remote audience, which task may be the answering of specific questions in a designated fashion. As described above, when confronted with a time zone problem, one or more off-camera announcers ask a number of questions in the form of the oral or module questions, which module questions are then selectively inserted into the tapes of television programs to be broadcast successively in different time zones. Alternatively, the second signal describing the task may be transmitted over the video channel by use of a display in front of the studio audience, the display having the questions set forth in large lettering which is read readily.

Figure 10:
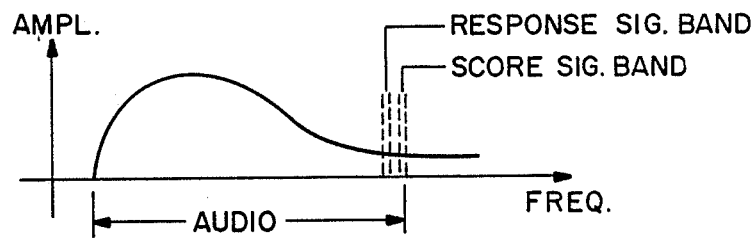
FIG. 10 shows the audio spectrum and a portion thereof designated for instructional signal bands of the second signal group utilized, respectively, for answers and criteria for evaluating answers.

With reference to both FIGS. 6 and 10, the central station 202 provides for a modulation of signals of the instructional signal group outputted by the keyboards 224 and 226 for the predetermined responses and scoring criteria within the audio channel to occupy narrow spectral bands in the upper portion of the audio spectral band. The system 200 is readily described in terms of four or more signals, the first signal being the television signal portraying activity in the studio 204. The second signal provides the description of the task to be performed by the studio and/or the remote audience. The studio scene and the task carried by the first two signals are presented diagrammatically in time sequence by a graph shown alongside the camera 228. The third signal carries the designated criteria for a response or range of responses entered by the host 212 upon the keyboard 224, such criteria being, by way of example, key words to be entered by the respondents. The fourth signal provides the scoring mode or guidelines entered by the host 212 upon the keyboard 226, such scoring being, by way of example, that an answer of the word "fish" is worth three points while an answer of the word "salmon" is worth five points. Additional examples of response criteria and scoring mode have been discussed hereinabove.

As example of a further signal, a fifth signal providing a verification code for use in verifying a printout of awards at a remote station may be sent subsequently along the same channel employed for transmission of the scoring criteria. The passbands of the third and the fourth signals, namely the response criteria and the scoring mode signals respectively, are indicated in FIG. 10, both of these passbands being much narrower than the passband of the audio spectrum, and carrying signal amplitude of relatively low levels, as compared to the audio signal, so as to avoid any interference with the transmission of the voice of the host 212. Since four separate signal channels are provided for the first four of the foregoing signals, these signals may be transmitted in any desired time sequence including a concurrent transmission of a plurality of these signals. One or more of the signals of the four channels may be retransmitted with an updated message, such as a reformatted scoring mode, to adapt the game program to audience responses, thereby to provide interaction between the host and the remote audience.

The central station 202 further comprises two signal processors 232 and 234, the summer 236, a combiner 238, a transmitter 240 and two oscillators 242 and 244 coupled respectively to the processors 232 and 234. The microphone 230 is connected to a first input terminal of the summer 236. The processor 232 is connected between the keyboard 224 and a second input terminal of the summer 236 for encoding designated response signals outputted by the keyboard 224, and for modulating the signals onto a carrier frequency $F_1$, which carrier frequency lies in the response signal band of FIG. 10.

Similarly, the processor 234 is connected between the keyboard 226 and a third input terminal of the summer 236 for coding scoring mode signals outputted by the keyboard 226, and for modulating these signals onto a carrier frequency $F_2$, the carrier frequency $F_2$ being within the score signal band of FIG. 10. The summer 236 combines the response and the score signals with the audio signal of the microphone 230 to output a sum signal to the combiner 238. The combiner 238 operates in a well-known fashion to combine the audio signal of the microphone 230 with the video signal of the camera 228 to output a composite television signal to the transmitter 240 for transmission via antenna 246 as the broadcast transmission 222.

Each of the processors 232 and 234 are constructed of the same components, these components being an encoder 248, a register 250, a modulator 252, a bandpass filter 254, and a clock 256. The operations of both of the processors 232 and 234 are the same and, accordingly, only the operation of the processor 234 need be described, it being understood that this description applies also to the processor 232.

In operation, the encoder 248 digitally encodes signals provided by respective keys 258 of the keyboard 226. The clock 256 outputs both a high speed clock signal and a low speed clock signal to the register 250. The high speed signal has a relatively high pulse repetition frequency for strobing bits of a digital signal outputted by the encoder 248 at a relatively high speed into the register 250. The bits of the digital signal are than outputted from the register 250 at a relatively low rate to the modulator 252 in response to strobing of the register 250 by the low speed clock signal. This arrangement of the high and low speed clocking allows a command to be entered at the keyboard 226 rapidly by the host 212, and then to be transmitted relatively slowly as a component of the audio signal. The slow transmission minimizes the requisite width of the score signal passband (FIG. 10). The modulator 252 may employ a suitable form of modulation as is commonly employed, such as amplitude modulation or phase modulation, for modulating the digital signal on the $F_2$ carrier. The modulated signal outputted by the modulator 252 is then coupled via the filter 254 to the summer 236, the filter 254 limiting the spectral components of the modulated signal to the desired passband of FIG. 10. In the same manner, the processor 232 digitally encodes signals entered by keys 260 of the keyboard 224, and modulates the digitally encoded signals of the designated response upon the $F_1$ carrier.

The television system 220 comprises a receiver 262, three demodulators 264, 266, and 268, a speaker 270, two bandpass filters 272 and 274, and two oscillators 276 and 278. Also shown in FIG. 6 is a telephone circuit 280 including a telephone at the remote station 206 and a telephone at the central station 202 which enable interaction in the form of direct communication between a member of the remote audience 216 and a person at the central station 202. The telephone at the central station 202 enables members of the remote audience 216 to communicate, when desired, with the host 212, for instance, to furnish their names for announcing on the air. The telephone circuit 280 is presented as a conveniently implemented form of communication system, it being understood that such communication is an optional feature and not essential to the practice of the invention, and that other forms of communication systems may be employed.

In operation, the receiver 262 receives the broadcast transmission 222 via an antenna 282, and outputs the received signal to the demodulator 264. The demodulator 264 operates in a well-known fashion to separate the audio and video portions of the television signal, the audio portion being applied to the speaker 270 and the video portion being presented on the television screen 208. Members of the remote audience 216 hear the voice of the host 212 on the speaker 270, and view the progress of the game 218 and other activities of the studio 204 on the screen 208. The filters 272 and 274 separate, respectively, the response and score signals from the audio spectrum and apply the signals, respectively, to the demodulator 266 and the demodulator 268. The oscillator 276 provides the $F_1$ carrier to the demodulator 266 for demodulation of the response signal to recover the designated responses. Similarly, the oscillator 278 provides the $F_2$ carrier to the demodulator 268 to enable the demodulation of the score signal to recover the scoring mode criteria. The response signal is applied by the demodulator 266 to the response unit 210 via line 346. The score signal is outputted by the demodulator 268 to the response unit 210 via line 348.

Figure 7:
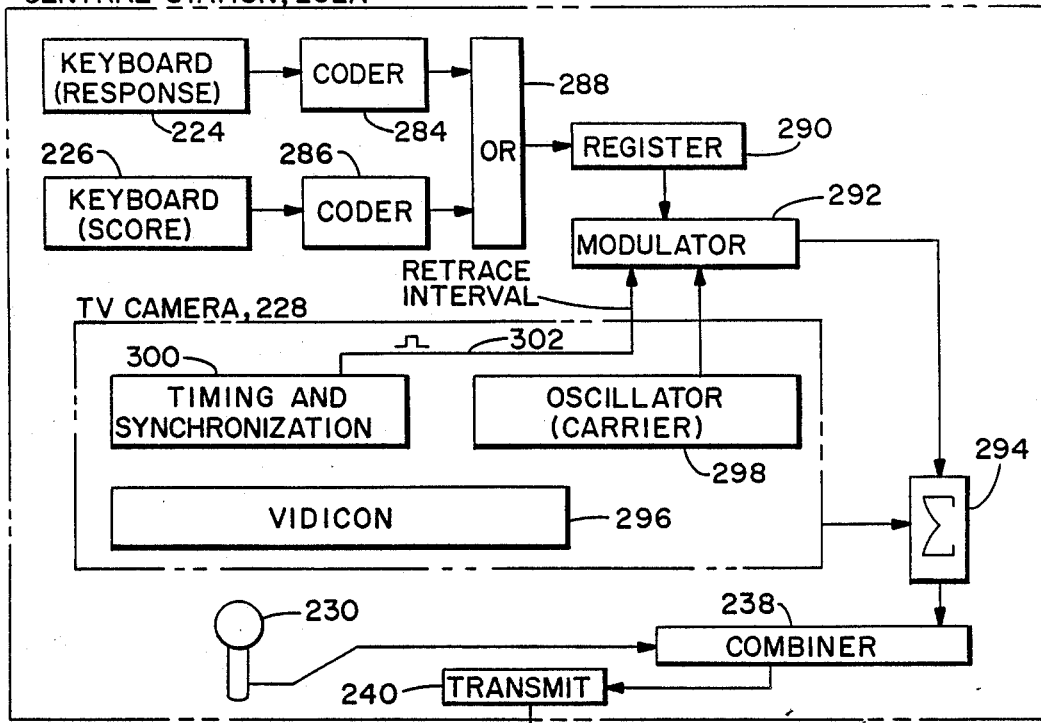
FIG. 7 is an alternative embodiment of the system of FIG. 6 wherein the signals of the second group are interleaved with the video signal of the first group by use of the vertical retrace time slot of a television transmission.
Figure 7:
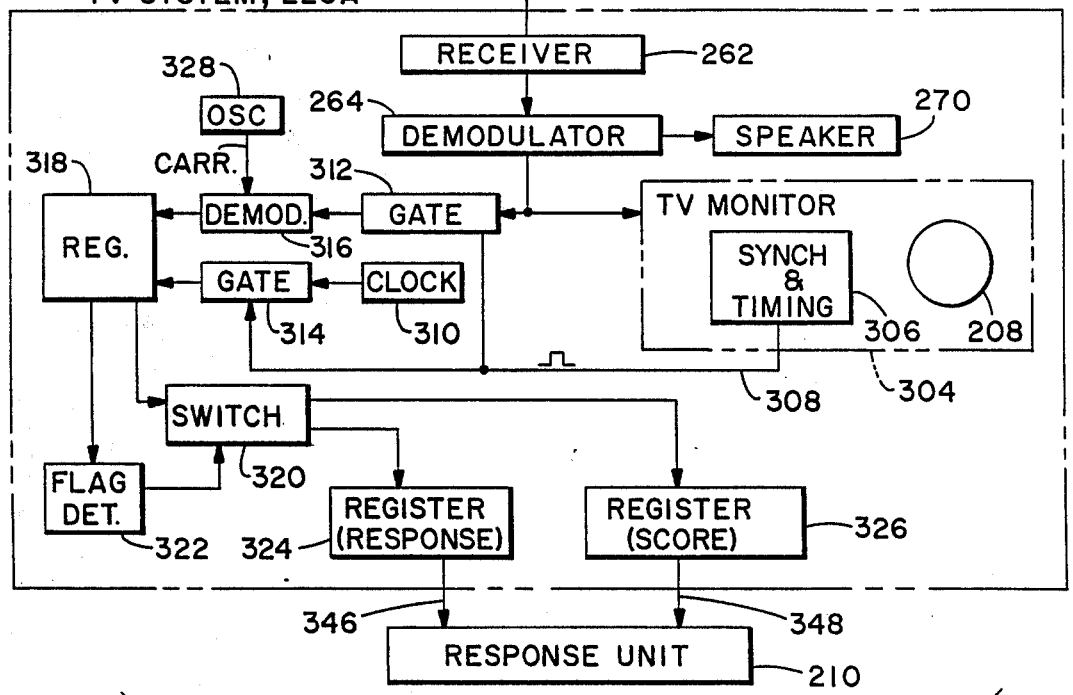

FIG. 7 shows a modification of the system 200 of FIG. 6 wherein the third and fourth signals, respectively, for the designated response and scoring mode criteria are transmitted in the video portion of the television signal rather than in the audio portion of the television signal. In FIG. 7, the modified system 200A comprises a central station 202A and a television system 220A which contains some of the components presented in the system 200 of FIG. 6, and has further components which provide for an interlacing of the third and the fourth signals with the television video portion by insertion of the third and the fourth signals within the time intervals allocated for the television vertical retrace. The system 200A is understood to include, when desired, the telephone circuit 280, the game 218, and the specimen 214 which have been deleted in FIG. 7 to simplify the presentation of the system 200A.

In the central station 202A, the signals outputted by the keyboards 224 and 226 are digitally coded by encoders 284 and 286, respectively, and applied via an OR circuit 288 to a register 290. The station 202A further comprises a modulator 292 and a summer 294 which operate with the combiner 238 and the transmitter 240. The television camera 228 includes a well-known vidicon 296, oscillator 298 for production of a carrier frequency, and timing and synchronization circuitry 300.

In operation, the encoded response criteria and scoring mode signals of the keyboards 224 and 226 are stored in the register 290 from which they are applied to an input terminal of the modulator 292. The modulator 292 is activated by a pulse signal on line 302 provided by the timing circuitry 300 during each vertical retrace interval in the generation of the television picture frame at the camera 228. The modulator 292 receives the encoded keyboard signals and modulates these signals onto the carrier provided by the oscillator 298, this carrier being the same carrier employed for carrying the television video signal. Thereby, the modulated keyboard signals outputted by the modulator 292, and the television video signal outputted by the camera 228 are on the same carrier, and are summed together by the summer 294. The output signal of the summer 294 contains both the video and the keyboard signals interleaved with each other. The output signal of the summer 294 is then combined with the signal of the microphone 230 by the combiner 238 and transmitted via the transmitter 240 to a remote receiving station 206A in the same fashion as was described for the system 200 of FIG. 6.

The broadcast transmission from the central station 202A is received by the receiver 262 and applied to the demodulator 264 which separates the audio and video portions of the broadcast transmission, the audio portion being applied to the speaker 270, and the video portion being applied to a television monitor 304 which includes the television screen 208. The monitor 304 includes well-known synchronization and timing circuitry 306 which is employed in converting the broadcast video to a picture presented on the screen 208, the timing circuitry 306 also providing a gate pulse signal on line 308 which is to be used for identifying the retrace interval so as to enable extraction of the designated response signal of the keyboard 224 and the scoring mode signal of the keyboard 226.

The television system 220A further comprises a clock 310, two gates 312 and 314, a demodulator 316, a register 318, a switch 320, a flag detector 322, and two registers 324 and 326.

In operation, the video signal outputted by the demodulator 264 is applied also via the gate 312 to the demodulator 316 which operates in conjunction with a carrier reference signal provided by an oscillator 328 to demodulate the signals of the keyboards 224 and 226. The operation of the demodulator 316 is opposite to the operation of the modulator 292 in the sense that, by way of example, if the modulator 292 employs phase modulation, then the demodulator 316 demodulates phase modulation.

The signal on line 308 activates the gate 312 to pass the modulated keyboard signals occurring during the retrace intervals, and to block the video signal appearing at all times other than during the retrace intervals. If desired, a similar gate (not shown) may be included within the monitor 304 for excluding the modulated keyboard signals from the monitor 304. Such signals appearing during the retrace intervals should not interfere with the operation of the monitor 304 because of the synchronization signals normally present in televised transmissions, which signals gate off the screen 208 during retrace intervals, as is well known.

The signal on line 308 also activates the gate 314 to conduct clock pulses from the clock 310 to the register 318 during each retrace interval. The clock pulses are employed to clock the digitally encoded keyboard signals from the demodulator 316 into the register 318. Included within each of the digitized keyboard signals is a digital flag which identifies whether a signal is the designated response signal of the keyboard 224 or the scoring mode signal of the keyboard 226. The keyboard signals are communicated from the register 318 via a switch 320 to the registers 324 and 326. The detector 322 detects the presence of the flag on digital signals outputted by the register 318, and operates the switch 320 to steer the designated response signals of the keyboard 224 to the register 324, and the scoring mode signals of the keypad 226 to the register 326. The registers 324 and 326 provide the keyboard signals to the response unit 210 for operation of the response unit 210 in a manner to be described.

Figure 8:
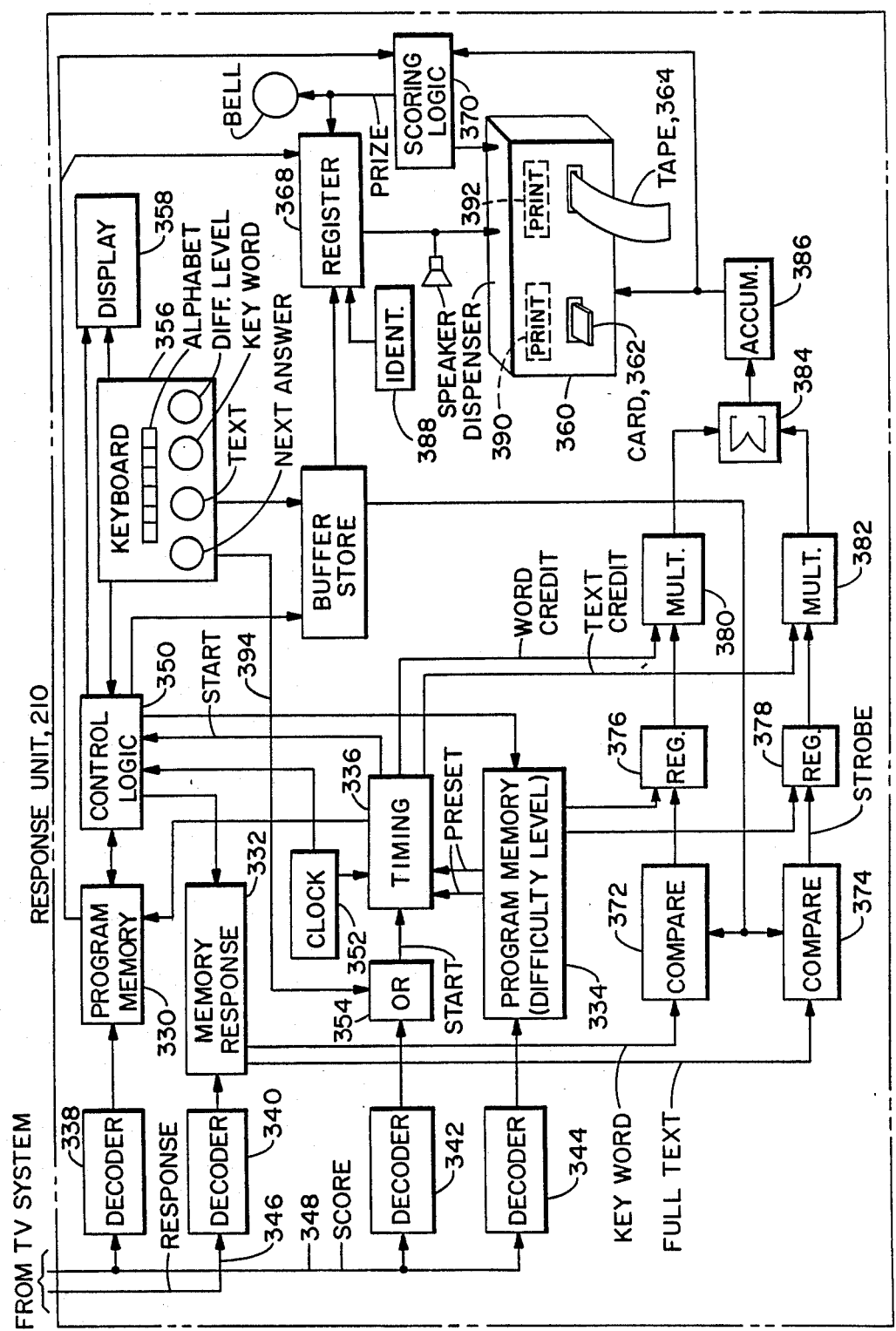
FIG. 8 is a block diagram of a response unit for use with either of the systems of FIGS. 6 and 7.

With reference to FIG. 8, the response unit 210 receives the designated response signals and the scoring mode signals, the signals being stored in memory for evaluating answers of the members of the remote audience 216 (FIG. 6) in responding to tasks set forth in the studio 204. In order to facilitate explanation of the response unit 210, the memory which stores data of the designated response criteria and the scoring mode, is shown as three separate memories, namely, a program memory 330 which stores instructions for operation of the response unit 210, a response-criteria memory 332 which stores a set of designated responses to be used as a reference against which audience response is to be judged, and a further scoring program memory 334 which stores values of difficulty level employed in the scoring of audience responses. A timing unit 336 is employed for interjecting a scoring factor based on the amount of time required or allowed to generate the response, and to apply zero credit in the situation wherein a member of the remote audience fails to respond within a predesignated time interval. The response unit 210 includes four decoders 338, 340, 342, and 344 which extract various portions of the digitized designated response criteria signal and scoring mode signal for application to individual ones of the memories 330 and 332, the timing unit 336 and the memory 334. The decoders 338 and 340 connect lines 348 and 346, carrying the scoring-mode and response-criteria signals, respectively, to the memories 330 and 332. The decoders 342 and 344 connect from line 348, carrying the scoring mode signal, respectively to the timing unit 336 and the memory 334.

Also included within the response unit 210 is a control logic unit 350, a clock 352 which provides clock pulse signals to the control logic unit 350 and the timing unit 336 and an OR circuit 354 which couples the decoder 342 to the timing unit 336. A keyboard 356 and, if desired, a display 358 coupled thereto interact with the control logic unit 350 for the entry of responses, the display 358 showing a member of the remote audience what symbols have been typed on the keyboard 356 during the generation of a response.

The response unit 210 further comprises a dispenser 360 of cards 362 and/or tape 364, or similar recording medium, which are imprinted with markings reflecting awards, if any, for responses entered by a member of the remote audience upon the keyboard 356. For example, the dispenser 360 can accept a preprinted form which may be inserted by a respondent and removed from the dispenser 360 after imprinting. Also, the response unit 210 comprises a buffer store 366, a register 368, a scoring logic unit 370, two comparators 372 and 374, two registers 376 and 378, two multipliers 380 and 382, a summer 384, and an accumulator 386.

In operation, the program memory 330 and the control logic unit 350 operate together in a manner similar to that of the program memory 108 and the control logic unit 118 of FIG. 4. The program memory 330 stores information as to the number of possible responses, the number of questions, and also stores instructions for commanding the dispenser to print out messages in accordance with scores based on responses to questions and other tasks set forth in the studio 204. The memory 332 stores possible answers to questions and tasks, such as colors of objects displayed in the studio 204, sizes of such objects, sentences or phrases describing events in history, music, art or literature, and similar information which may be transmitted via the response criteria signal to the remote stations. The timing unit 336 includes counters and memories as will be described with reference to FIG. 9 for outputting appropriate factors or coefficients for use in scoring responses based on time of response. The memory 334 stores designated time intervals which are to be inputted as preset signals to the counters of the timing unit 336, and also stores factors to be applied in the scoring or grading of responses based on level of difficulty. Such level of difficulty information is transmitted from the central station via the scoring mode signal to the remote stations. After presentation of a task in the studio 204, the host 212 indicates the beginning of a time interval for audience response by pressing a key on the keyboard 226, this resulting in the transmission of a start signal to the response unit 210. The decoder 342 decodes the start signal and applies the start signal via the OR circuit 354 to initiate timing in the timing unit 336, the start signal proceeding through the timing unit 336 to the control logic unit 350 to initiate operation of the logic unit 350. Operation of the three memories 330, 332, and 334 is under control of the logic unit 350.

In one type of question-response situation, the host 212 gives a contestant a choice of questions to which the contestant is to respond. For example, two or three groups of questions may be presented on the television screen 208. The answers to all of the questions are loaded into the memory 332. The contestant indicates a selection of a group of questions by means of the keyboard 356, a selection signal then being outputted by the keyboard 356 to the logic unit 350 to address the memory 332 to provide the desired set of answers for evaluating the contestant's response.

While various forms of responses may be desired for specific situations which may be depicted in the studio 204, two situations of particular interest are those wherein a response is to be evaluated based on a series of words, as in a phrase, or by examination of key words present in a phrase or sequence of sentences to be provided as a response. The response unit 210 is provided with dual channel comparison to score responses based on observation of key words or on observation of full text. One of these channels is composed of the comparator 372, the register 376, and the multiplier 380. The other of these two channels is composed of the comparator 374, the register 378, and the multiplier 382. Both of these comparator channels operate in the same fashion.

The first comparator channel is employed for evaluating responses based on the presence of a key word. This is accomplished as follows. A member of the remote audience presses a key-word button on the keyboard 356 to alert the control logic unit 350 that a key word is to be entered. The key word is typed on the keyboard 356 which then places the key word in the buffer store 366 and, preferably, also presents the key word on the display 358 to ensure that the key word is spelled correctly. The buffer store 366, under control of the logic unit 350, presents the key word to one input terminal of the comparator 372. The memory 332 presents the designated key word to the other input terminal of the comparator 372. The comparator 372 compares the designated key word with the response, and outputs a logic-1 signal to the register 376 to indicate a favorable comparison. If the key word of the response differs from the key word of the memory 332, then the comparator 372 outputs a logic-0 signal to the register 376. The memory 334 outputs a predetermined number of points of credit to the register 376 for an at-least partially correct or acceptable response. The outputting of the logic-1 signal from the comparator 372 strobes the register 376 to receive the credit from the memory 334. The number of points of credit are outputted by the register 376 to the multiplier 380 to serve as a factor or coefficient in computing the score for a correct answer. The timing unit 336 outputs a further factor to the multiplier 380 based on the amount of time consumed to produce the response. The multiplier 380 multiplies together both the acceptable-answer coefficient and the time-consumption coefficient to output a product to the summer 384, which product is the score for the response. The amount of credit in the credit factor outputted by the timing unit 336 is dependent on the amount of time; in the event that a maximum time interval is exceeded, the timing credit is zero which results in a score of zero being outputted by the multiplier 380.

By way of alternative embodiments, it is noted that the multipliers 380 and 382 may be replaced with summers, in which case the score would be based upon the sum of the acceptable-answer coefficient and the time-consumption coefficient. The actual range of numerical values of the score will differ, depending on whether multiplication or addition of the acceptable-answer coefficient and the time-consumption coefficient is to be employed in the construction of the response unit 210. Either embodiment of the response unit 210 produces a readily understandable score; the embodiment to be employed is simply a matter of preference in the desired range of score values.

In the same fashion, the comparator 374 compares a full text, as in a series of words composing a phrase, which text is compared by the comparator 374 against the text entered at the keyboard 356 by way of response. The corresponding scoring factors are applied by the memory 334 and the timing unit 336, respectively, to the register 378 and the multiplier 382. The comparator 374 strobes the register 378 to apply a scoring factor to the multiplier 382 to output the score from the multiplier 382 to the summer 384. A sequence of scores outputted by the summer 384 in response to a sequence of responses to a task or game situation presented in the studio 204 are accumulated by the accumulator 386. The output of the accumulator 386 is the total score, which total score is inputted both to the dispenser 360 and to the scoring logic unit 370. The accumulator 386 is reset by the control logic unit 350 in accordance with commands of the scoring mode signal; thus, the total score outputted by the accumulator 386 may be the result of response to questions of a single task or of a sequence of tasks as may be commanded by the program host.

In the scoring logic unit 370, the total score is compared with a range of scores presented by the program memory 330. The scoring logic unit 370 outputs a command signal to the dispenser unit 360 when the respondent's score meets the response criteria or is in a designated range, and the dispenser 360 prints the total score. Also, when the total score is within an acceptable range of score, the logic unit 370 directs the dispenser 360 to print a monetary award, or other designation of award on either the card 362 or the tape 364, and may activate a bell to signal success. Sounding of the bell may also be used to direct a respondent to begin the next task. Dispenser 360 may be designed for either one or both types of printouts. The award and other information, such as time limits for redemption, instructions to the merchant and a coded validation signal, are applied by the memory 330 to the register 368 for inclusion in the printout of the dispenser 360. By way of example, the validation signal may be encoded with the time of day and date of the television program and be combined with a number identifying the remote station. The identity of the remote station is supplied by an encoder 388 (which may be a thumbwheel digital encoder) to the register 368 for inclusion within the printout of the dispenser 360. The buffer store 366 also connects to the register 368 to permit imprinting of the actual response in a printout of the dispenser 360. Printers 390 and 392 within the dispenser 360 can provide for imprinting in the form of alphanumeric and symbolic indicia, or by means of bar code. By way of example, the printers 390 and 392 may be constructed as dot-matrix printers. If desired, the printer 390 may be constructed to output the printed message on a magnetic strip (not shown) of the card 362.

The keyboard 356 is provided with a "text" key as well as a "word" key to enable a respondent to answer in the text mode or in the key-word mode. By the inclusion of alphanumeric keys, as in a standard typewriter keyboard, a person may respond by entering key words or phrases. A respondent may answer a question in significantly less time than is allocated for the question, in which case the respondent may wish to indicate task completion before the full allotted time has elapsed, or before the host 212 (FIG. 6) tells the audience to proceed to the next question. In this case, the respondent pushes the "next answer" key or button on the keyboard 356 resulting in the transmission of a strobe signal along line 394 to an input terminal of the OR circuit 354 to restart the timing unit 336 for the next question and answer. Also, in the event that there is a choice of questions and responses, each at a different level of difficulty, the respondent employs the "difficulty level" button on the keyboard 356 to signify, via the control logic unit 350, to the program memory 334 that an answer of a designated difficulty is being attempted. Thereby, the memory 334 in conjunction with the timing unit 336 can provide proper scoring factors for various conditions of response such as accuracy and a shortening of the time interval set by the host. Generally, in determining the value of award to a successful contestant, some or all of the following factors are taken into consideration, namely, the quality of response as evidenced by accuracy, responsiveness, comprehension and comprehensiveness, as well as speed of response and difficulty level.

Normally, the difficulty level announced by the host will be "difficulty level one", with which a certain award is associated. Correspondingly greater awards may be announced for correct answers at higher difficulty levels. The choice of selecting such higher difficulty level rests with the contestants and may, where a choice of subject matters is offered, be made after the host has announced the general subject matter or the nature of the next question.

Figure 9:
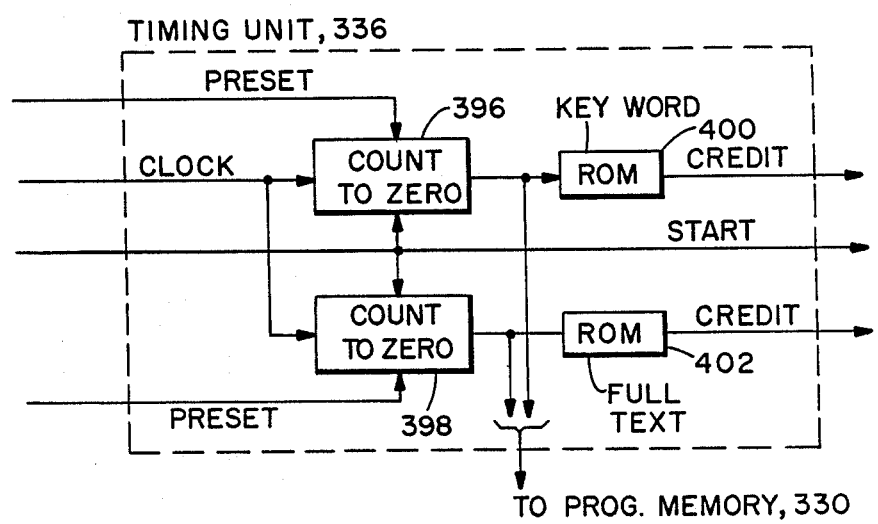
FIG. 9 is a block diagram of a timing unit of FIG. 8.

FIG. 9 shows details of the timing unit 336 of FIG. 8, the timing unit 336 comprising two counters 396 and 398, and two memories 400 and 402 wherein each of the memories 400 and 402 is preferably a read-only memory (ROM). The counters 396 and 398 are preset, as noted above, by signals from the program memory 334 of FIG. 8. The counters 396 and 398 count clock pulses supplied by the clock 352. Each of the counters 396 and 398 counts down from its preset value to zero. The counters 396 and 398 address, respectively, the memories 400 and 402. Output counts of each of the counters 396 and 398 also serve as address signals for operating the program memory 330. Counting by the counters 396 and 398 is initiated upon application of the start signal from the OR circuit 354, the start signal being outputted to the control logic unit 350. Each of the memories 400 and 402 is loaded with appropriate values of credit to be applied to responses, respectively, for key words or numbers and full text. For example, a question answered by a key word in ten seconds might receive a time credit factor of ten points, while a 20-second response time might receive only three points, and any response beyond a half minute might receive a zero points resulting in a zero score. It is noted that a count by either of the counters 396 or 398 from its preset value down to zero automatically terminates an allocated predetermined time interval and results in an outputting of zero score.

With respect to the system and methodology of the invention, communication with the home audience by the normal television channels of electronic transmission includes signals broadcast on television frequencies via cable including fiber optics or satellite. A typical example in the propagation of such electronic signals would be that transmission to a communication satellite which, in turn, transmits the signals to ground receiving sites adapted to send the signals either from broadcast stations over the air or via cable to cable subscribers. These signals include the first two signals of Group One mentioned hereinabove, namely the program and the task signals, received by the television receivers at each of the remote locations at which a television viewer is located. Encouragement of as many viewers as possible to participate is accomplished by allowing the television viewers to become contestants who participate in a quiz program or other audience-participation program on the spur of the moment and in the middle of a program wherein the participants win prizes.

According to the method of the invention, the number of prizes awarded and their values are set by the sponsor of the program, and normally are set so as to optimize the financial return to the sponsor or broadcaster. Normally, in a quiz program, a plurality of tasks will be presented. Each task is formulated in such form that the task setting message may be electronically transmitted from the central location as the second signals or second set of signals of the aforementioned Group One to be received by the viewers at the remote locations. It is noted that all of the signals comprising Group One may be transmitted at the same time, such as by being part of the same pictorial presentation. A simple illustration of such presentation would involve a celebrity appearing before a television camera, holding a sign reading "Who am I?".

Typically, these tasks comprise questions to be answered by viewers who wish to become contestants. The tasks may differ with respect to fields of knowledge, memory skills and reaction speed, literacy, comprehension, expression and experience required, and other aspects. The time allowed viewers to respond to a task may vary. The task may take any form of questions including single-answer questions and multiple-part questions. The questions may also call for one or more multiple choice answers. There may be a requirement that, with respect to a specific task, a minimum number of responses must be provided by participants. The questions may also be open-ended in the sense that viewers can not completely answer a question within an allotted time, a practice common in aptitude tests. A task could, for instance, involve a listing of a large number of names or other data in response to a question to which the answers are more numerous than can be answered within the prescribed time. Normally, the host announces the period of time allowed for entering answers at the time a question is posed. At substantially the same time, the host or other person aiding in the program, may also announce or hint at the general subject area of the next question, the purpose of such announcement being to enable a contestant to elect a higher difficulty level to apply to a favored subject area. Thus, the response criteria may consist of a simple requirement to be met by a respondent, or may comprise a plurality of independently variable elements.

Questions may also be asked by a host in conjunction with television advertisements or "commercials". In such an event, a host or off-camera announcer may first direct the attention of the audience to the fact that the next question will deal with an aspect or feature of the product or service about to be displayed or offered. Awards may also be announced. This type of incentive will significantly increase viewers' attention and recall.

Questions may also be visually posed to the television viewers by displaying the questions on electronic boards or on other display means. Alternatively, the host may silently point to an advertised item of merchandise to insure that participants are paying attention to the television commercial, in which event a question may relate to such merchandise. The awarding of prizes to viewers who correctly answer questions relating to goods or services shown in a preceding commercial is believed to greatly enhance consumer recall.

It is noted that a question asked with reference to an offered item may call for no more than a simple mention of the specimen displayed, or of specific features thereof, so that in effect, the viewers are simply verifying that they are tuned in to the desired program. There is little or no difficulty in responding to such question posed to the viewers.

The range of difficulty levels needs no specific limitation. As an illustration, one may consider the task of listing within a period of 20 seconds as many countries as possible that are members of the United Nations.

The award or prize won by a successful contestant is computed in accordance with the response criteria and the scoring basis or mode which may be formulated by the host or program conductor. As noted above, the response criteria and the scoring mode or basis are transmitted from a central station to remote locations through the response-criteria and scoring-mode signals of the aforementioned Group Two. Specific and different response criteria may be set for each question, and may include a different time period allowed for such response. The instructional group of signals, Group Two, conveys the data constituting an acceptable answer or range of answers, as well as the value of the award to be given a successful contestant based on the applicable difficulty level, the accuracy and completeness of the answer to be provided. The elements of the response criteria may be varied from question to question.

The instructional group of signals, Group Two, may also contain, as a subset, additional command signals such as the above-noted validation signal to permit certification and verification of an award claimed by a contestant or member of the remote audience. Such data typically consists of alphanumeric information appearing on the contestant's printout to facilitate verification.

The instructional group of signals may also contain, as another subset, further additional command signals addressed to the scoring circuitry, which additional signals convey data governing the issue of the printout and its terms, including place of redemption and time limitations.

As an example of various forms of programming which may be employed, questions are displayed on an electronic board seen by the television viewers. Alternatively, a question appears on a display board in the television studio and a plurality of numbered answers appear on a separate display so that a television contestant only needs to enter the number of the selected answer believed to correspond to an acceptable answer and to the response criteria. The latter type of visual presentation is particularly suitable for game shows involving multiple choice answers. Particularly successful, or otherwise selected participants, may engage in a personal dialogue with the host. A printout from the dispenser 360 may also serve as a voucher to be exchanged for a ticket at a theater or sporting event.

It is noted that members of the studio audience may also participate in the quiz program. In such event, one display may contain questions for the home viewing audiences, while the studio contestants may be asked a different set of questions. In such a situation, effectively, two separate quiz programs are being conducted substantially concurrently.

In the conduction of such television program, provisions may also be made to announce and/or display to the television audience information regarding awards that are to be won at different difficulty levels. This information may be provided before, during, or after the corresponding question has been asked, although it normally is made known to viewers at approximately the time that the question is asked. As an illustration, a split television screen technique may be employed wherein part of the screen displays information and/or pictures relating to the question being asked, and another part of the screen displays a table having tabulated information showing a relationship between difficulty levels, and available prizes or discounts from the base price towards the purchase of certain merchandise. If desired, a portion of the split-screen presentation may be hidden from the studio audience. The host announces the number of difficulty levels and the general subject area relative to each question. The host may also announce the base or minimum difficulty level applicable to a specific question so that each contestant has sufficient time to elect to respond under the conditions of the difficulty level set by the host or under conditions of a higher difficulty level. In accordance with the foregoing elected situations, requisite command signals of the instructional signal group, Group Two, are transmitted for directing the dispenser to print out such tabulated award data. Successful participants may be informed of the fact that they have won an award via the audio or video portion of the television signal, or by directing the dispenser to print out a message describing the award. The record or other signal by which a contestant is informed of the outcome of his or her response may be simply "award" or "no award" announcement, or a similar simple notification.

As a further feature in the construction of the invention, the scoring-mode signal generated at the keyboard 226 (FIG. 6) for use in the program memory 330 and scoring logic unit 370 (FIG. 8) may include a delay signal interposed by the host which delays operation of the bell as well as a printing out of notification of award by the dispenser 360 until after a determined time interval This encourages contestants and viewers to continue watching the television program until the program, or a portion thereof, has been completed.

It is also noted that the card 362 with data encrypted by use of bar code or magnetic recording can be machine readable. This permits use of the card in an automatic dispenser of merchandise at a store wherein such merchandise is dispensed. The dispensing machinery would include a well known card reader and verification circuitry which may operate with a personal identification number known only to the contestant to insure that the merchandise is dispensed to the correct person. It is also noted that the pertinent information can be given over the telephone to allow for purchases by mail.

Another, interaction between members of the remote audience and the host is accomplished by means of the optional two-way communication afforded by use of the telephone circuit 280 (FIG. 6) in combination with the signal channels of the television transmission. For example, the host 212 may be a professor conducting a home-study course. The host presents a set of examination questions to home students via the television screen, and transmits various possible responses and scoring criteria via lines 346 and 348 (FIG. 8) to the response unit 280. Students may call in via the telephone circuit 280 to inform the host that the questions relate to material not yet fully covered in the course. The host then operates the keyboard 224 (FIG. 6) to reformat or modify the possible responses, transmitted via line 346, so that the students can give an acceptable response based on the material already covered in the course. In addition, the host operates the keyboard 226 to reformat the mode of scoring to provide a different distribution of score points for various key words and phrases. Further alteration in the mode of scoring can be accomplished, by the host, by operation of the keyboard 226 to alter the amount of time allocated to each question. The difficulty levels stored in the memory 334 may also be altered or reformatted by the host so as to provide a curving of the score distribution to give extra credit to those students who studied course materials in advance of the present curriculum.

The foregoing example in the teaching of a home-study course shows an aspect in the methodology of the invention in which a succession of instructional signals relating to designating acceptable responses and scoring criteria to be applied to responses may be transmitted from the central station 202 to remote receiving stations 206. In a general case, such a succession of instructional signals would be interleaved with communications from persons at the remote stations 206 to the central station 202 to enable the response criteria to be modified to fit the needs of the remote audience. This provides further interaction between the host and the remote audience.

As a further example in the modification of scoring criteria, the studio audience and the remote audience may be engaged in a program for the development of foreign language skills. The host, in this case a language instructor, may submit a set of questions requiring responses in the form of phrases for describing situations depicted in a studio game. If members of the studio audience experience difficulty in answering the questions, then the host would use the keyboards 224 and 226 to modify the scoring criteria, before complaints from the remote audience arrive via the telephone circuit 280. In this example, a succession of instructional signals may be transmitted without direct interaction with the remote audience, and with modification of response criteria and/or scoring mode being based on response of the studio or external audience. In this way, the format of acceptable responses can be updated at the response units 210 in the remote stations 206 in anticipation of remote audience needs. The response unit 210 stores the modified scoring criteria in the memories 330, 332 and 334, the contents of these memories being updated with each transmission of an instructional signal. The operation of the response unit 210 in scoring answers entered by a contestant to a language development game, or other form of game, is based on the most recently transmitted instructional signal.

The foregoing examples in the use of the invention show that the system and methodology of the invention are adaptable to the needs of members of the remote audience. Adaptation can take place by interaction with members of the remote audience, as well as by anticipation of the needs of the remote audience based on observation of responses of the studio audience.

This enhances the quality of audience participation, ensures better success in accomplishing the purposes of the television games, and elicits greater satisfaction on the part of both studio and remote audiences.

With reference to FIGS. 1 and 6, it is noted by way of alternative embodiments of the invention that the use of both audio and visual channels, and the use of both television and radio transmissions permits various transmission arrangements to be employed. For example, instead of employing one central television transmitter and one central radio transmitter, as shown in FIG. 1, a network of such transmitters can be employed for transmitting the program from the studio 14 throughout the United States. In the case of the transmission of the instructional signal by radio, in a network transmission, individual radio stations might alter the instructional signals for different scoring criteria and rewards in different geographic areas while all geographic areas would receive the same television program and task-setting messages. By way of further variation of transmission arrangements, the voice signal of the announcer at the studio can be stopped, and replaced by voice signals at the radio transmitters of the various geographic areas to allow different task-setting messages to be generated audially at the different geographic areas along with the different instructional signals at the various geographic areas. These variations of transmission arrangements provide a flexibility to the implementation of the invention so as to adapt the task-setting and scoring to needs of local areas.

It is also noted that the invention can be employed even in the situation wherein television may not be available to some members of the remote audience. With reference to the receiving station 16 of FIG. 1, in the absence of any television transmission (possibly due to mountains) or in the absence of television sets, the host 50 (FIG. 3) would describe audially and fully the program situation by use of the microphone 56, and would also present the tasks audially by the microphone 56. Thereby, both the audio description and the instructional signals would be transmitted by radio channel.

Also, the microphone 56 may be shut off in which case all task-setting messages would be indicated visually, as by signs and posters, on the television screens of the receiving stations. In this case, the audio channel would be used only for the instructional signals while the program would be conducted silently on the television screens.

Furthermore, the program can be conducted silently, as above, with occasional audio commentary and/or background music, a television format commonly employed by cable television news services. In this case the program and task-setting messages would be transmitted by television with visual presentation of the tasks by signs or posters with the microphone 56 being used only for the occasional comment and playing of background music.

The foregoing situation can be modified further by the substitution of the normal television program format by presentation of a television screen showing only lines of alphanumeric characters, similar to that of a printed portion of a magazine or newspaper. Such a format is used frequently in cable television news by broadcasts employing a channel known as an automated channel. With reference to FIG. 6, the automated channel can be implemented, by way of example, by use of a display system including a character generator (not shown) for generating the text, and a screen (not shown) for presenting the text in front of the camera 228 to be televised. Or the television signals may be generated by a suitably programmed computer (not shown). With respect to the implementation of the invention for broadcast of a quiz program by use of an automated channel, the following observations are noted.

Normally, automated channels are used in cable television to provide information in visual alphanumeric or graphic form, utilizing a character generator, and transmitting news updates, financial news, programs guides, weather information and the like. If computer type storage is provided at receiving stations, text displayed in this manner on screens at receiving stations may be scrolled in a desired direction. A voice or music audio portion accompanies the visual information.

The automated channel type of television broadcast lends itself well to the presentation of questions and falls within the scope of the present invention. A Home Quiz program of the type described may consist entirely of questions, or the questions may be interspersed with the types of information listed above. As an example, a question is displayed on the screens at remote locations for the period of time allowed for answering the question, after which the data entering devices do not accept contestants' responses. The correct answers of a series of acceptable answers then appear on the screens for an interval of time enabling contestants to ascertain whether they have won an award as evidenced by a printout emitted by the dispenser. Alternatively, correct answers may be provided orally by a program conductor. Such broadcast requires only very limited studio facilities and is economical to produce. The electronic equipment at remote locations can be very simple, providing only for yes-or-no answers, or can be as complex as is desired.

The type of question and answer broadcast on automated channels lends itself particularly well to education and research. In the field of education, after a time interval allowed for answering a question has expired, a correct answer may be provided orally or visually by the program host, and may be accompanied by extensive explanations and narratives. This method still enables students to mail or deliver examination papers dispensed to them by the electronic printer in the above-described dispenser to an educational institution conducting the test. Such examination forms have printed thereon each student's scored answers.

The use of automated channels permits the implementation of the methods described in a highly economical manner, particularly in the area of education of children. Incentives can be provided to children to take an interest in subjects to be taught by rewarding successful answers to questions which dispenses tokens, such as coupons, carrying an award of interest to children of the age group addressed. The increasing familiarity of children with computer keyboards makes the use of data entering devices a— simple task. In the field of use of research, free-standing questions on automated channels may be interspersed with questions pertaining to research conducted. Some questions on automated channels are phrased so that the answers will provide statistically or otherwise meaningful responses, while other questions contain a challenge inherent in answering such a question. For example, a question may require personal judgment, special knowledge, or characterization.

As a further example, a demographic researcher may intersperse between questions regarding respondent's income and expenditures the question "What is the average annual per capita income in your county?". A successful respondent wins an award in order to encourage wider participation in such a survey. In market research, the ability to leave a printed text on a cable television screen for a period of time, and to accompany a question with an oral explanation will not only make respondent's answers to such questions easier and therefore more reliable, but will make the conducting of surveys or automated channels a very economical method of reaching unprecedented numbers of respondents.

By way of further embodiment to the invention, it is noted that the tape 364 (FIGS. 6 and 8) outputted by the dispenser 360 of the response unit 310 may be imprinted with a bar code, as portrayed in FIG. 6. The bar code may be read by a scanner 404. The reading of the scanner 404 may be transmitted to a receiver 406 at the central station 202 via modems 408 and 410 connected to the telephone circuit 280.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A method for remotely evaluating and creating a record of responses to a plurality of task-setting messages electronically transmitted to receivers at remote locations, the method comprising:
   transmitting a first set of electronic signals conveying a first task-setting message of said plurality of messages from a central station to receivers at remote locations;
   receiving said first set of signals at said remote locations;
   entering responses to said first task-setting message at said remote locations;
   generating, at said central station, a first response criteria independently of said transmitting of said first set of electronic signals;
   transmitting from a central station a second set of electronic signals conveying said first response criteria relative to said first task-setting message to said remote locations;
   receiving said second set of signals at said remote locations;
   comparing said responses with said first response criteria, said first response criteria comprising suitable words including alphanumerics and other indicia, and said responses comprising words including alphanumerics and other indicia; and
   identifying individual ones of said responses meeting said first response criteria; and wherein
   said step of comparing provides for a comparing of at least one key word or element in a response with said first response criteria;
   said first response criteria includes a scoring basis, said method further comprising steps of:
   scoring accepted responses meeting said scoring basis of said first response criteria;
   modifying, at said central station said first response criteria to provide a second response criteria independently of said transmitting of said first set of electronic signals;
   transmitting additional ones of said first set of electronic signals for conveying additional task-setting messages of said plurality of messages; and
   transmitting to said remote locations additional ones of said second set of electronic signals to convey said second response criteria governing responses to said additional task-setting messages.

2. A method according to claim 1 further comprising a step of creating a record of scored responses; and wherein
   said first response criteria includes a timing of said responses for a predetermined time interval;
   said step of entering responses is performed by means of a data entry device at a remote location;
   said step of modifying includes altering said timing and changing said scoring basis; said method further comprising steps of
   presenting said first task-setting message to a studio audience after expiration of said time interval for response; and
   communicating activity of said studio audience to said remote locations.

3. A method according to claim 1 further comprising a step of creating a record of said responses and wherein
   said first response criteria includes a timing of said responses for a predetermined time interval;
   said step of entering responses is performed by means of a keyboard;
   said step of modifying includes altering said timing and changing said scoring basis; and
   a response can include a narrative text entered on said keyboard, said step of creating of a record including creating a record of narrative text in hard-copy format.

4. A method according to claim 1 wherein said generating includes a step of formatting said first response criteria by setting a plurality of difficulty levels as part of the response criteria of a question.

5. A method according to claim 4, wherein,
   said first response criteria includes a timing of said responses for a predetermined time interval; and
   in said formatting step, a difficulty level is at least in part determined by the time allowed for answering a question by an entering of a response.

6. A method according to claim 1 wherein, in said step of transmitting said first set of electronic signals, questions are visually posed through a video portion of a television program.

7. A system for broadcasting a task-setting program signal from a central site to a plurality of receiving stations at remote sites, and for responding to said task-setting program signal at said receiving stations, said system comprising:
   means at said central site for transmitting said task-setting program signal;
   means at each of said receiving stations for presenting a program transmitted by said program signal to an audience, said program being a television program;
   means at said central site for transmitting an instructional signal incorporating predetermined response criteria including a timing of a response;
   means at said central site for encoding said instructional signal, said encoding means being suitable for operation by a host of said television program, said instructional-signal transmitting means including means for modulating encoded instructional signals upon a voice channel of said television program;
   means at each of said receiving stations responsive to said instructional signal for storing said predetermined response criteria;
   means at each of said receiving stations for entering responses by said audience to a task presented in said program;
   means at each of said receiving stations for comparing individual ones of said audience responses to said predetermined response criteria;
   means coupled to said comparing means for scoring said audience responses; and
   demodulation means at said receiving station coupled to said predetermined response-criteria storing means for extracting said instructional signal from said voice channel of said transmitted program signal; and wherein said entering means includes buffer storing means for storing said audience responses, said buffer storing means outputting the audience response to said comparison means;

said scoring means includes means for selectively altering a mode of scoring individual ones of said audience responses in response to said instructional signal; and wherein said instructional signal can be altered to change criteria of said scoring mode independently of a transmission of the program signal.

8. A system according to claim 7, further comprising:
means at each of said receiving stations responsive to said instructional signal for activating and deactivating said scoring means; and means for outputting a hard copy of said responses, said hard copy including a scoring result of said responses upon activation of said scoring means, and excluding a scoring result of said responses upon a deactivating of said scoring means.

9. A system for broadcasting a task-setting program signal from a central site to a plurality of receiving stations at remote sites, and for responding to said task-setting program signal at said receiving stations, said system comprising:

means at said central site for transmitting said task-setting program signal;

means at each of said receiving stations for presenting a program transmitted by said program signal to an audience;

means at said central site for transmitting an instructional signal incorporating predetermined response criteria;

means at each of said receiving stations responsive to said instructional signal for storing said predetermined response criteria;

means at each of said receiving stations for entering a response by said audience to a task presented in said program;

means at each of said receiving stations for comparing said audience response with said predetermined response criteria;

means coupled to said comparing means for scoring said audience response; and recording means coupled to said scoring means for generating a record of responses meeting said predetermined response criteria; and wherein said recording means outputs a recording medium storing said record for subsequent reading;

said scoring means includes means for timing the response of said audience;

said scoring means includes means responsive to said instructional signals for selectively altering a mode a scoring individual ones of said audience responses in response to said instructional signal; and wherein said instructional signal can be altered to change criteria of said scoring means independently of a transmission of the program signal.

10. A system for broadcasting a task-setting program signal from a central site to a plurality of receiving stations at remote sites, and for responding to said program signal at said receiving stations, said system comprising:

means at said central site for transmitting said task-setting program signal;

means at each of said receiving stations for presenting a program transmitted by said program signal to an audience;

means at said central site for transmitting an instructional signal incorporating predetermined response criteria;

means at each of said receiving stations responsive to said instructional signal for storing said predetermined response criteria;

means at each of said receiving stations for entering a response by said audience to a situation presented in said program;

means at each of said receiving stations for comparing said audience response to said predetermined response criteria;

means coupled to said comparing means for scoring said audience response; and means at said central site for encoding said instructional signal, and wherein said instructional-signal transmitting means includes means for modulating encoded instructional signals upon a voice signal to be transmitted by said instructional signal transmitting means;

said system further comprising demodulation means at each of said receiving stations coupled to said response-criteria storing means for extracting said instructional signal from said voice signal of said transmitted programs signal; and means at each of said receiving stations coupled to said scoring means for generating a record on a recording medium, a result of said scoring appearing on said recording medium upon activation of said scoring means; and wherein said record generating means provides said record with at least one distinguishing indicium selected from a group consisting of discrete dashes, connected, dashes, dots, regular shapes, irregular shapes, codes, numbers, letters and symbols, so as to prevent tampering, forging, and counterfeiting;

said entering means includes buffer storing means for storing said audience response, said buffer storing means outputting individual responses of the audience to said comparison means;

said scoring means includes means responsive to said instructional signal for timing individual responses of said audience;

said scoring means includes means for selectively altering criteria employed in a mode of scoring in response to said instructional signal; and wherein said means for transmitting said instructional signal includes means for altering said instructional signal, independently of a transmission of a program signal, to activate said scoring means to alter said timing.

11. A system for broadcasting a task-setting program signal from a central site to a plurality of receiving stations at remote sites, and for responding to said program signal at said receiving stations, said system comprising:

means at said central site for transmitting said task-setting program signal;

means at each of said receiving stations for presenting a program transmitted by said program signal to an audience;

means at said central site for transmitting an instructional signal incorporating predetermined response criteria;

means at each of said receiving stations responsive to said instructional signal for storing said predetermined response criteria;

means at each of said receiving stations for entering a response by said audience to a situation presented in said program;

means at each of said receiving stations for comparing said audience response with said predetermined response criteria;

means coupled to said comparing means for scoring individual responses of said audience; and wherein said scoring means includes means responsive to said instructional signal for timing individual responses of said audience, said timing means having means for setting a time interval allowed for entering said responses;

said entering means includes buffer storing means for storing said audience response, said buffer storing means outputting the audience response to said comparison means;

said scoring means is capable of altering a mode of scoring in response to said instructional signal; and said system further comprises:

recording means coupled to said scoring means for outputting a record of scored responses of said audience, said record having easily recognizable indicia and being in the form of hard copy;

means at each of said receiving stations responsive to said instructional signal for activating and deactivating said scoring means; and wherein said hard copy includes results of a scoring of said responses upon activation of said scoring means, and excludes a scoring of said responses upon a deactivating of said scoring means;

a response produced on said hard copy is in alphanumeric form; and said means for transmitting said instructional signal includes means for altering said instructional signal; independently of a transmission of a program signal, to activate said scoring means to alter said timing.

12. A system for broadcasting a task-setting program signal from a central site to a plurality of receiving stations at remote sites, and for responding to said program signal at said receiving stations, said system comprising:

means at said central site for transmitting said task-setting program signal;

means at each of said receiving stations for presenting a program transmitted by said program signal to an audience;

means at each of said receiving stations for entering a response by said audience to a situation presented in said program;

means at each of said receiving stations coupled to said entering means for generating a hard copy of said response;

means at said central site for transmitting an instructional signal delineating acceptable responses and a mode of scoring such responses;

means at each of said receiving stations responsive to said instructional signal for storing an acceptable response to said program signals;

means coupled to said entering means and to said storing means for scoring said response, a result of said scoring means appearing on said hard copy upon activation of said scoring means; and means responsive to said instructional signal for activating said scoring means; and wherein said means for transmitting said instructional signal includes means for altering said instructional signal, independently of a transmission of the program signal, to activate said scoring means to alter a mode of scoring by said scoring means.

13. A system for broadcasting a task-setting program signal from a central site to a remote audience at a plurality of receiving stations and for responding to said program signal at said receiving stations, said system comprising:

means at said central site for transmitting said task-setting program signal;

means at each of said receiving stations for presenting a program transmitted by said program signal to said remote audience;

means at said central site for transmitting an instructional signal incorporating formatted response criteria, said response criteria including a mode of scoring responses and a period of time allowed respondents for entering responses;

formatting means at said central site suitable for operation by a conductor of said broadcast program for formatting said response criteria prior to transmission of said response criteria by said transmitting means, said formatting means being suitable for operation by a conductor of said broadcast program for reformatting said response criteria by altering said instructional signal independently of a transmission of the program signal, reformatted response criteria including selective alteration of response criteria consisting of the mode of scoring responses or the period of time allowed respondents for entering responses;

means at said central site suitable for operation by a conductor of said broadcast program for encoding said instructional signal;

means included in said instructional-signal transmitting means for modulating said encoded instructional signal upon a voice channel of a program broadcast from said central site;

means at each of said receiving stations responsive to said instructional signal for storing formatted and reformatted response criteria;

means at each of said receiving stations for entering responses by members of said remote audience to a task presented in said program, said entering means including buffer storing means at each remote location for storing said remote audience response;

demodulation means at each of said receiving stations coupled to said response entering means for extracting said instructional signal from said voice channel of said transmitted program signal;

means at said receiving stations for comparing each of said remote audience responses with said formatted or reformatted response criteria;

means included in said buffer storing means for outputting said remote audience response to said comparing means;

means at said receiving stations, and coupled to said comparing means, for scoring said remote audience responses, and means for timing such responses, said scoring means operating on the basis of a period of time allowed for entering a response by members of said remote audience in accordance with formatted or reformatted response criteria and;

means for recording said scored responses.

14. A method for remotely evaluating and creating a record of responses to task-setting messages electronically transmitted to receivers at remote locations, which method comprises:
- formulating a plurality of task-setting messages for sequential transmission to members of a remote audience;
- formatting response criteria for a task of said task-setting messages, said response criteria including acceptable responses, a scoring basis with difficulty level and a timing of said responses for determined time intervals;
- transmitting electronic task-setting signals conveying said task-setting messages from a central station to receivers at remote locations;
- receiving said signals conveying said task-setting messages at said remote locations;
- transmitting from a central station electronic response-criteria signals conveying response criteria governing responses to each task of said task-setting messages, said response-criteria signals being transmitted to said remote locations;
- receiving said response-criteria signals at said remote locations;
- entering responses to said task-setting messages on data-entering devices at said remote locations;
- comparing said responses with acceptable responses meeting said response criteria;
- identifying individual ones of said responses meeting said response criteria;
- scoring each response relative to the scoring basis of said response criteria;
- creating a record on a recording medium at each of said remote locations of scored response results from said scoring step, wherein said creating includes providing said record with at least one distinguishing indicium selected from a group consisting of discrete dashes, connected, dashes, dots, regular shapes, irregular shapes, codes, numbers, letters and symbols, so as to prevent tampering, forging, and counterfeiting;
- modifying by at least partially reformatting said response criteria independently of said transmitting of said task-setting signals to fit a subsequent task;
- transmitting the response-criteria signals with modified response criteria independently of a transmission of said task-setting signals; and
- repeating the foregoing steps, wherein a repetition of modifying a response criteria includes a reformatting of individual ones of said first-mentioned response criteria independently of said transmitting of said task-setting signals to be applied to tasks of subsequent ones of said task-setting messages.

15. A method according to claim 14 further comprising a step of providing a split-screen television presentation for communicating between said central station and said remote audience.

16. A method according to claim 14, wherein the step of entering responses is performed by means of a keyboard and a response can include a narrative text; and wherein said narrative text is scored in said step of scoring by scoring means and outputted in said record-creating step by copy-generating means in the form of hard copy.

17. A method according to claim 14, wherein the step of modification of said first-mentioned response criteria includes altering said scoring basis and the time allowed for entering responses.

18. A method according to Claim 14, wherein signals transmitted constitute separate quiz programs conducted concurrently, said method further comprising the steps of presenting questions to studio contestants, and separately presenting questions to home contestants.

19. A method according to Claim 14, intended to permit individuals at remote locations to participate in task-setting programs of the type requiring an answer to a question presented by a program conductor, further comprising a step of allowing said individuals to select the difficulty level of an acceptable response after knowing the general subject matter of a question, but before knowing the answer to the question.

20. A method according to Claim 14, intended to permit individuals at remote locations to participate in task-setting programs of the type requiring answers to questions presented by a program conductor, wherein said scoring step includes a step of scoring partially correct answers by storing in a data storage memory a plurality of cross-referenced key symbols, key words or key phrases, and wherein said comparing step includes comparing said symbols, words or phrases with the entered responses and evaluating the comparison results under command of a program memory.

21. A method according to Claim 14, intended to permit individuals at remote locations to participate in task-setting programs of the type requiring a response to a task presented by a program conductor, wherein said record-creating step includes a step of providing a recording medium in the form of an examination blank or form and recording a scored response thereon.

22. A method according to Claim 14, intended to permit individuals at remote locations to participate in task-setting programs of the type requiring answers to questions presented by a program conductor, wherein said scoring step includes a step of grading examination papers containing said responses by identifying in said examination papers a plurality of specified key symbols, key words or key phrases included in said response criteria.

23. A method for remotely evaluating and creating a record of responses to task-setting messages electronically transmitted to receivers at remote locations, which method comprises:
- formulating a plurality of task-setting messages for sequential transmission to members of a remote audience;
- formatting response criteria for a task of said task-setting messages, said response criteria including acceptable responses, a scoring basis with difficulty level and a timing of said responses for determined time intervals;
- transmitting electronic task-setting signals conveying said task-setting messages from a central station to receivers at remote locations;
- receiving said signals conveying said task-setting messages at said remote locations;
- transmitting from a central station electronic response-criteria signals conveying response criteria governing responses to each task of said task-setting messages, said response-criteria signals being transmitted to said remote locations;
- receiving said response-criteria signals at said remote locations;

entering responses to said task-setting messages on data-entering devices at said remote locations;

comparing said responses with acceptable responses meeting said response criteria;

identifying individual ones of said responses meeting said response criteria;

scoring each response relative to the scoring basis of said response criteria;

creating a record on a recording medium at each of said remote locations of scored response results from said scoring step;

modifying by at least partially reformatting said response criteria independently of said transmitting of said task-setting signals to fit a subsequent task;

transmitting the response-criteria signals with modified response criteria independently of a transmission of said task-setting signals;

repeating the foregoing steps, wherein a repetition of modifying a response criteria includes a reformatting of individual ones of said first-mentioned response criteria independently of said transmitting of said task-setting signals to be applied to tasks of subsequent ones of said task-setting messages; and wherein the method is intended to permit individuals at remote locations to participate in task-setting programs of the type requiring answers to questions presented by a program conductor, wherein said record-creating step includes a step of dispensing a hard-copy record of the processed response, said hard copy comprising a redeemable coupon and having imprinted thereon advertising material or shopping hints.

24. A method according to claim 14, wherein said response record comprises material which has been treated by at least one treatment selected from a group of process steps consisting of magnetizing, coloring, coating, embossing and texturing.

25. A method according to claim 14, wherein said response record having at least one of said distinguishing indicia is further distinguished by use of a process step providing at least one additional distinguishing indicium selected from the group consisting of color, intensity, width, spacing, positioning, font and resolution, so as to prevent tampering, forging, and counterfeiting.

26. A method according to claim 25 wherein said at least one indicium has been applied by a process step selected from the group consisting of printing, ink spraying, heating, magnetic pulses, light sources and laser beams.

27. A method according to claim 14, wherein said at least one indicium have been applied by a process step selected from the group consisting of printing, ink spraying, heating, magnetic pulses, light sources and laser beams.

28. A method for remotely evaluating and creating a record of responses to task-setting messages electronically transmitted to receivers at remote locations, which method comprises;

formulating a plurality of task-setting messages for sequential transmission to members of a remote audience;

formatting response criteria for a task of said task-setting messages, said response criteria including acceptable responses, a scoring basis with difficulty level and a timing of said responses for determined time intervals;

transmitting electronic task-setting signals conveying said task-setting messages from a central station to receivers at remote locations;

receiving said signals conveying said task-setting messages at said remote locations;

transmitting from a central station electronic response-criteria signals conveying response criteria governing responses to each task of said task-setting messages, said response-criteria signals being transmitted to said remote locations;

receiving said response-criteria signals at said remote locations;

entering responses to said task-setting messages on data-entering devices at said remote locations;

comparing said responses with acceptable responses meeting said response criteria;

identifying individual ones of said responses meeting said response criteria;

scoring each response relative to the scoring basis of said response criteria;

creating a record on a recording medium at each of said remote locations of scored response results from said scoring step;

modifying by at least partially reformatting said response criteria independently of said transmitting of said task-setting signals to fit a subsequent task;

transmitting the response-criteria signals with modified response criteria independently of a transmission of said task-setting signals; and repeating the foregoing steps, wherein a repetition of modifying a response criteria includes a reformatting of individual ones of said first-mentioned response criteria independently of said transmitting of said task-setting signals to be applied to tasks of subsequent ones of said task-setting messages; and wherein tampering, forging, and counterfeiting of the record is prevented by including in said record-creating step a further step of providing a recording medium of tamper resistant composition.

29. A method according to claim 14, in which tampering, forging, and counterfeiting of the record is prevented by including in said record-creating step a further step of providing a recording medium containing admixtures of identifiable substances.

30. A method according to claim 14, wherein said record is in the form of a questionnaire, said method further comprising the steps of storing different questionnaires for alternative uses in a dispenser;

storing programs in a memory; and selecting a program determining a specific questionnaire to be used and the form and extent of processing responses entered by respondents.

31. A method according to claim 14 further comprising a step of:

providing in a program memory a plurality of scoring programs adapted to output to a counter incremental commands in accordance with a desired magnitude of a score to be awarded, said counter to be employed in said scoring step, and a step of providing comparator circuitry adapted to increase such score award in accordance with higher difficulty levels of the task presented, which comparator circuitry is to be employed in said comparing step.

32. A method for remotely evaluating and creating a record of responses to task-setting messages electronically transmitted to receivers at remote locations, which method comprises:

formulating a plurality of task-setting messages for sequential transmission to members of a remote audience;

formatting response criteria for a task of said task-setting messages, said response criteria including acceptable responses, a scoring basis with difficulty level and a timing of said responses for determined time intervals;

transmitting electronic task-setting signals conveying said task-setting messages from a central station to receivers at remote locations;

receiving said signals conveying said task-setting messages at said remote locations;

transmitting from a central station electronic response-criteria signals conveying response criteria governing responses to each task of said task-setting messages, said response-criteria signals being transmitted to said remote locations;

receiving said response-criteria signals at said remote locations;

entering responses to said task-setting messages on data-entering devices at said remote locations;

comparing said responses with acceptable responses meeting said response criteria;

identifying individual ones of said responses meeting said response criteria;

scoring each response relative to the scoring basis of said response criteria;

creating a record on a recording medium at each of said remote locations of scored response results from said scoring step;

modifying by at least partially reformatting said response criteria independently of said transmitting of said task-setting signals to fit a subsequent task;

transmitting the response-criteria signals with modified response criteria independently of a transmission of said task-setting signals;

repeating the foregoing steps, wherein a repetition of modifying a response criteria includes a reformatting of individual ones of said first-mentioned response criteria independently of said transmitting of said task-setting signals to be applied to tasks of subsequent ones of said task-setting messages; and providing means for altering the difficulty level of said first-mentioned response criteria by a program conductor or by an individual respondent.

33. A method for remotely evaluating and creating a record of responses to task-setting messages electronically transmitted to receivers at remote locations, which method comprises:

formulating a plurality of task-setting messages for sequential transmission to members of a remote audience;

formatting response criteria for a task of said task-setting messages, said response criteria including acceptable responses, a scoring basis with difficulty level and a timing of said responses for determined time intervals;

transmitting electronic task-setting signals conveying said task-setting messages from a central station to receivers at remote locations;

receiving said signals conveying said task-setting messages at said remote locations;

transmitting from a central station electronic response-criteria signals conveying response criteria governing responses to each task of said task-setting messages, said response-criteria signals being transmitted to said remote locations;

receiving said response-criteria signals at said remote locations;

entering responses to said task-setting messages on data-entering devices at said remote locations;

comparing said responses with acceptable responses meeting said response criteria;

identifying individual ones of said responses meeting said response criteria;

scoring each response relative to the scoring basis of said response criteria;

creating a record on a recording medium at each of said remote locations of scored response results from said scoring step;

modifying by at least partially reformatting said response criteria independently of said transmitting of said task-setting signals to fit a subsequent task;

transmitting the response-criteria signals with modified response criteria independently of a transmission of said task-setting signals;

repeating the foregoing steps, wherein a repetition of modifying a response criteria includes a reformatting of individual ones of said first-mentioned response criteria independently of said transmitting of said task-setting signals to be applied to tasks of subsequent ones of said task-setting messages; and permitting an individual respondent to select a difficulty level before knowing a question to be responded to by said response entering step.

34. A system according to any of claims 9, 10, or 11 wherein said timing means includes means for setting a time interval allowed for entering said responses.

35. A system according to any one of claims 9, 10, or 11 wherein said timing means further includes means for deactivating said scoring means upon expiration of a predetermined time interval.

36. A broadcasting system according to claim 12, the system being employed for teaching an audience remote from a central site, the system further comprising
   timing means operatively coupled to said scoring means for setting a time interval allowed for entering said response; and
   interactive means for providing communication from said remote sites to said central site.

37. A broadcasting system according to claim 13, the system being employed for aiding research by an audience remote from a central site, the system wherein
   said timing means sets a time interval allowed for entering said responses, said system further comprising
   interactive means for providing communication from said remote sites to said central site.

38. A system according to claim 36 wherein said timing means further includes means for deactivating said scoring means upon termination of said time interval.

39. A system according to claim 37 wherein said timing means includes means for deactivating said scoring means upon termination of said time interval.

40. A method according to claim 14 wherein said formatting step includes a step of setting individual elements of response criteria for each task.

41. A method for remotely evaluating and creating a record of responses to task-setting messages electronically transmitted to receivers at remote locations, which method comprises:

formulating a plurality of task-setting messages for sequential transmission to members of a remote audience;

formatting response criteria for a task of said task-setting messages, said response criteria including acceptable responses, a scoring basis with difficulty level and a timing of said responses for determined time intervals;

transmitting electronic task-setting signals conveying said task-setting messages from a central station to receivers at remote locations;

receiving said signals conveying said task-setting messages at said remote locations;

transmitting from a central station electronic response-criteria signals conveying response criteria governing responses to each task of said task-setting messages, said response-criteria signals being transmitted to said remote locations;

receiving said response-criteria signals at said remote locations;

entering responses to said task-setting messages on data-entering devices at said remote locations;

comparing said responses with acceptable responses meeting said response criteria;

identifying individual ones of said responses meeting said response criteria;

scoring each response relative to the scoring basis of said response criteria;

creating a record on a recording medium at each of said remote locations of scored response results from said scoring step;

modifying by at least partially reformatting said response criteria independently of said transmitting of said task-setting signals to fit a subsequent task;

transmitting the response-criteria signals with modified response criteria independently of a transmission of said task-setting signals;

repeating the foregoing steps, wherein a repetition of modifying a response criteria includes a reformatting of individual ones of said first-mentioned response criteria independently of said transmitting of said task-setting signals to be applied to tasks of subsequent ones of said task-setting messages; and wherein said formatting includes a step of setting a plurality of difficulty levels as part of the response criteria of a question.

42. A method for remotely evaluating and creating a record of responses to task-setting messages electronically transmitted to receivers at remote locations, which method comprises:

formulating a plurality of task-setting messages for sequential transmission to members of a remote audience;

formatting response criteria for a task of said task-setting messages, said response criteria including acceptable responses, a scoring basis with difficulty level and a timing of said responses for determined time intervals;

transmitting electronic task-setting signals conveying said task-setting messages from a central station to receivers at remote locations;

receiving said signals conveying said task-setting messages at said remote locations;

transmitting from a central station electronic response-criteria signals conveying response criteria governing responses to each task of said task-setting messages, said response-criteria signals being transmitted to said remote locations;

receiving said response-criteria signals at said remote locations;

entering responses to said task-setting messages on data-entering devices at said remote locations;

comparing said responses with acceptable responses meeting said response criteria;

identifying individual ones of said responses meeting said response criteria;

scoring each response relative to the scoring basis of said response criteria;

creating a record on a recording medium at each of said remote locations of scored response results from said scoring step;

modifying by at least partially reformatting said response criteria independently of said transmitting of said task-setting signals to fit a subsequent task;

transmitting the response-criteria signals with modified response criteria independently of a transmission of said task-setting signals;

repeating the foregoing steps, wherein a repetition of modifying a response criteria includes a reformatting of individual ones of said first-mentioned response criteria independently of said transmitting of said task-setting signals to be applied to tasks of subsequent ones of said task-setting messages; and wherein, in said formatting step, a difficulty level is at least in part determined by the time allowed for answering a question by an entering of a response.

43. A method for remotely evaluating and creating a record of responses to task-setting messages electronically transmitted to receivers at remote locations, which method comprises:

formulating a plurality of task-setting messages for sequential transmission to members of a remote audience;

formatting response criteria for a task of said task-setting messages, said response criteria including acceptable responses, a scoring basis with difficulty level and a timing of said responses for determined time intervals;

transmitting electronic task-setting signals conveying said task-setting messages from a central station to receivers at remote locations;

receiving said signals conveying said task-setting messages at said remote locations;

transmitting from a central station electronic response-criteria signals conveying response criteria governing responses to each task of said task-setting messages, said response-criteria signals being transmitted to said remote locations;

receiving said response-criteria signals at said remote locations;

entering responses to said task-setting messages on data-entering devices at said remote locations;

comparing said responses with acceptable responses meeting said response criteria;

identifying individual ones of said responses meeting said response criteria;

scoring each response relative to the scoring basis of said response criteria;

creating a record on a recording medium at each of said remote locations of scored response results from said scoring step;

modifying by at least partially reformatting said response criteria independently of said transmitting of said task-setting signals to fit a subsequent task;

transmitting the response-criteria signals with modified response criteria independently of a transmission of said task-setting signals;

repeating the foregoing steps, wherein a repetition of modifying a response criteria includes a reformatting of individual ones of said first-mentioned response criteria independently of said transmitting of said task-setting signals to be applied to tasks of subsequent ones of said task-setting messages; and wherein said step of scoring provides that an answer to the same question at higher difficulty levels carries a greater award.

44. A method for remotely evaluating and creating a record of responses to task-setting messages electronically transmitted to receivers at remote locations, which method comprises:

formulating a plurality of task-setting messages for sequential transmission to members of a remote audience;

formatting response criteria for a task of said task-setting messages, said response criteria including acceptable responses, a scoring basis with difficulty level and a timing of said responses for determined time intervals;

transmitting electronic task-setting signals conveying said task-setting messages from a central station to receivers at remote locations;

receiving said signals conveying said task-setting messages at said remote locations;

transmitting from a central station electronic response-criteria signals conveying response criteria governing responses to each task of said task-setting messages, said response-criteria signals being transmitted to said remote locations;

receiving said response-criteria signals at said remote locations;

entering responses to said task-setting messages on data-entering devices at said remote locations;

comparing said responses with acceptable responses meeting said response criteria;

identifying individual ones of said responses meeting said response criteria;

scoring each response relative to the scoring basis of said response criteria;

creating a record on a recording medium at each of said remote locations of scored response results from said scoring step;

modifying by at least partially reformatting said response criteria independently of said transmitting of said task-setting signals to fit a subsequent task;

transmitting the response-criteria signals with modified response criteria independently of a transmission of said task-setting signals;

repeating the foregoing steps, wherein a repetition of modifying a response criteria includes a reformatting of individual ones of said first-mentioned response criteria independently of said transmitting of said task-setting signals to be applied to tasks of subsequent ones of said task-setting messages; and informing a television audience, prior to posing a question, of awards associated with each difficulty level of a particular question.

45. A method according to claim 44, wherein the step of informing is accomplished by a host by making an announcement correlating a shorter time period allowed for answering a question with a higher difficulty level.

46. A method according to claim 44, wherein the step of informing is accomplished by the host by announcing a general subject area of a question to be posed, and a step by a contestant of determining the difficulty level applicable to answers to such question based on a general subject area before knowing the specific question.

47. A method according to claim 44 including a step by a contestant, prior to knowing a question, of shortening a period of time allowed for answering the question, so as to answer a question at a higher difficulty level carrying a greater award.

48. A method according to claim 14 wherein, in said step of transmitting said task-setting electronic signals, questions are visually posed on television.

49. A method according to claim 14 further comprising a step of conducting a quiz program for studio audiences independently, but substantially concurrently with a quiz program for home viewing audiences.

50. A system according to claim 10 wherein, in said storing means, response criteria including scoring method can be updated by replacing previous data, and may also be retained for repeated utilization pursuant to radio command signals from said instructional-signal transmitting means.

51. A system for broadcasting a task-setting program signal from a central site to a plurality of receiving stations at remote sites, and for responding to said program signal at said receiving stations, said system comprising:

means at said central site for transmitting said task-setting program signal;

means at each of said receiving stations for presenting a program transmitted by said program signal to an audience;

means at said central site for transmitting an instructional signal incorporating predetermined response criteria;

means at each of said receiving stations responsive to said instructional signal for storing said predetermined response criteria;

means at each of said receiving stations for entering a response by said audience to a situation presented in said program;

means at each of said receiving stations for comparing said audience response to said predetermined response criteria;

means coupled to said comparing means for scoring said audience response;

means at said central site for encoding said instructional signals, and wherein said instructional-signal transmitting means includes means for modulating encoded instructional signals upon a voice signal to be transmitted by said instructional signal transmitting means;

said system further comprising demodulation means at each of said receiving stations coupled to said response-criteria storing means for extracting said instructional signal from said voice signal of said transmitted programs signal; and means at each of said receiving stations coupled to said scoring means for generating a record on a recording medium, a result of said scoring appearing on said recording medium upon activation of said scoring means; and wherein said entering means includes buffer storing means for storing said audience response, said buffer storing means outputting individual responses of the audience to said comparison means;

said scoring means includes means responsive to said instructional signal for timing individual responses to said audience;

said scoring means includes means for selectively altering criteria employed in a mode of scoring in response to said instructional signal; and wherein said means for transmitting said instructional signal includes means for altering said instructional signal, independently of a transmission of a program signal, to activate said scoring means to alter said timing;

said system further including selection means at remote locations and operable by a contestant to select one of several specified alternative subject areas of a question.

52. A system according to claim 10 wherein said scoring means is operable by a contestant for selecting a mode of scoring a response based on a shorter response interval of time.

53. A system for broadcasting a task-setting program signal from a central site to a plurality of receiving stations at remote sites, and for responding to said program signal at said receiving stations, said system comprising:

means at said central site for transmitting said task-setting program signal;

means at each of said receiving stations for presenting a program transmitted by said program signal to an audience;

means at said central site for transmitting an instructional signal incorporating predetermined response criteria;

means at each of said receiving stations responsive to said instructional signal for storing said predetermined response criteria;

means at each of said receiving stations for entering a response by said audience to a situation presented in said program;

means at each of said receiving stations for comparing said audience response to said predetermined response criteria;

means coupled to said comparing means for scoring said audience response; and means at said central site for encoding said instructional signal, and wherein said instructional-signal transmitting means includes means for modulating encoded instructional signals upon a voice signal to be transmitted by said instructional signal transmitting means;

said system further comprising demodulation means at each of said receiving stations coupled to said response-criteria storing means for extracting said instructional signal from said voice signal of said transmitted programs signal; and means at each of said receiving stations coupled to said scoring means for generating a record on a recording medium, a result of said scoring appearing on said recording medium upon activation of said scoring means; and wherein said entering means includes buffer storing means for storing said audience response, said buffer storing means outputting individual responses of the audience to said comparison means;

said scoring means includes means responsive to said instructional signal for timing individual responses to said audience;

said scoring means includes means for selectively altering criteria employed in a mode of scoring in response to said instructional signal; and wherein said means for transmitting said instructional signal includes means for altering said instructional signal, independently of a transmission of a program signal, to activate said scoring means to alter said timing; and said response criteria includes a plurality of responses at differing levels of difficulty including higher and lower levels of difficulty, and said scoring means is operable by a contestant for scoring a response based on a higher difficulty level.

54. A system according to claim 53 wherein said scoring means is responsive to a contestant for shortening an allowed period of response.

55. A system according to claim 10 wherein said program transmitting means further comprises television transmission means at said central site and television screen means at remote locations operative in a split screen mode to inform the remote audience of an award associated with a difficulty level.

56. A system according to claim 10 having television display means for the display of task-setting messages of said program signal.

57. A system according to claim 10 further comprising means responsive to said scoring means at remote locations for audibly announcing an award to a successful contestant.

58. A system according to claim 10 further comprising dispenser means coupled to said scoring means to output said record of scoring results, said record being a printout having imprinted thereon a bar code, which bar code is suitable for transmission to the central site by means of telephone modems, and is suitable for reading by scanners.

59. A system according to claim 10 wherein said comparing means includes first comparison means for comparing a key word of a response to a reference word, and second comparison means for comparing a set of words to a set of reference words.

60. A system according to claim 10 including selection means at remote locations and operable by a contestant to select one of several specified alternative subject areas of a question; and wherein said comparing means includes means for rejecting responses failing to meet the response criteria; and in said data storing means, response criteria including scoring method can be updated by replacing previous data, and may also be retained for repeated utilization pursuant to radio command signals from said response-criteria transmitting means.

61. A method according to claim 14 further comprising a step of providing television screen means at remote locations operative in split screen mode for communicating between said central station and said remote locations; and wherein said task-setting messages include a question to be asked, said method further comprising a step of informing the remote audience through said split screen means of a plurality of alternative subject areas of a question to be asked.

62. A method according to claim 14 further comprising a step of sequentially televising a plurality of programs, said programs including audio portions carrying said task-setting messages, and a step of varying said tasks with each audio portion.

63. A method according to claim 14 further comprising a step of sequentially televising a plurality of programs to members of the audience at remote locations geographically located in different time zones, said programs including audio portions carrying said task-setting messages; the method further comprising the steps of transmitting individual ones of said audio portions to remote locations in different ones of said time zones; and varying said tasks among the audio portions transmitted to the remote locations in different ones of said time zones.

64. A method according to claim 1 wherein said first and said second sets of signals are transmitted as part of a television program containing a predetermined number of tasks, said method including a step of televising said program repeatedly; and wherein there is a number of formulated different task-setting messages which is larger than that required for said program; and there is one set of task-setting messages which is transmitted in a first such program and a set of different task-setting messages transmitted in a second such program at a time different from that of said first program.

65. A method according to claim 1 wherein there are a plurality of said task-setting messages, said task-setting messages define a plurality of tasks for which responses are to be entered, and said generating step includes a step of setting individual response criteria for each of said tasks;

said step of transmitting electronic signals conveying a task-setting message includes a transmitting of task-setting messages to receivers at locations in different time zones; there being a further step of varying tasks of said task-setting messages for presentation of different tasks to receivers in different time zones, the task-setting messages transmitted to the receivers in the different time zones including a common visual program in each of said time zones accompanied by tasks which differ in each of the time zones.

66. A method according to claim 14 wherein said task-setting signals include a television program, said step of transmitting task-setting signals including a transmission to different geographic locations, said step of transmitting said task-setting signals being repeated for successive transmissions of a common television program to the different locations; and wherein said step of formulating task-setting messages provides for a plurality of different tasks with respective ones of said tasks accompanying respective transmissions of said common program to respective ones of the locations.

67. A method for evaluating responses to task-setting messages electronically transmitted from a central station to members of a remote audience who have responded to said messages in a manner meeting predetermined response criteria, which method comprises the steps of:

transmitting audio-visual signals to the members of the remote audience, the audio-visual signals conveying a presentation of data accompanied by task-setting messages defining tasks to be performed by members of the audience;

transmitting signals conveying response criteria to members of the remote audience at remote locations for responding to individual ones of said task-setting messages, said response criteria including a scoring basis for responses to be entered by the members of the remote audience, said scoring basis including a difficulty level;

entering responses to said task-setting messages by members of said audience;

comparing individual ones of said responses entered by a member of said remote audience with said response criteria;

scoring each response relative to said response criteria in correlation with a difficulty level;

creating a record on a recording medium at each said remote locations of scored response results from said scoring step, wherein said creating includes providing said record with at least one distinguishing indicium selected from a group consisting of discrete dashes, connected, dashes, dots, regular shapes, irregular shapes, codes, numbers, letters and symbols, so as to prevent tampering, forging, and counterfeiting;

allowing interaction between a member of the remote audience and the central station by means of a communication link between a remote location and the central station;

altering the response criteria in accordance with said interaction; and permitting further response by members of the remote audience in accord with altered response criteria.

68. A method according to claim 67 further comprising a step of retransmitting said audio-visual signal with a revised task setting message for modifying at least one task to be performed by members of the remote audience.

69. A method according to claim 68 wherein said step of scoring includes a step of timing responses of members of the remote audience in accordance with said altered response criteria.

70. A system for evaluating responses by members of an audience to task-setting messages electronically transmitted from a central station to locations remote from the central station, the audience members being located at the remote locations, the system comprising:

first transmitter means for transmitting audio-visual signals to the remote locations, the audio-visual signals conveying a presentation of data accompanied by task-setting messages defining tasks to be performed by members of the audience relative to said presentation;

response means at the remote locations operable by individual ones of the audience members for responding to the task-setting messages;

second transmitter means for transmitting response-criteria signals to the remote locations, the response means being activated by the response-criteria signals, said response criteria signals conveying a response criteria including a scoring basis for evaluating acceptable responses to be entered by the audience members; and wherein said response means includes means for comparing a response entered by an audience member with said response criteria;

means for scoring a response to output a score based on said scoring basis;

means coupled to said scoring means for generating a record on a recording medium, a result of said scoring means appearing on said recording medium upon activation of said scoring means;

communication means allowing interaction between an audience member and the central station; and wherein said record generating means provides said record with at least one distinguishing indicium selected from a group consisting of discrete dashes, connected, dashes, dots, regular shapes, irregular shapes, codes, numbers, letters and symbols, so as to prevent tampering, forging, and counterfeiting; and at least one of said first and said second transmitter means provides for modification of their respective signals to alter the acceptability of a response.

71. A system according to claim 70 wherein said scoring means includes means for establishing a plurality of difficulty levels against which responses are scored by said scoring means, said altered response criteria including difficulty level.

72. A method according to claim 1 further comprising steps presenting said first task-setting message to a studio audience; and communicating activity of said studio audience to said remote locations.

73. A system according to claim 12 wherein said copy-generating means comprises means for selecting a recording medium to serve as said hard copy, said selecting means being responsive to said instructional signal.

74. A method according to claims 3 or 14 further comprising a step of providing on said record an alphanumeric code permitting verification of an award.

75. A method according to claims 3 or 14 further comprising a step of providing on said record a machine readable code permitting verification of an award.

76. A method according to claim 14 wherein said record-creating step includes a step of providing as said recording medium a form having a grid and recording a scored response thereon, said method permitting persons at remote locations to participate in task-setting programs of the type requiring answers to a task presented by a program conductor, said task requiring a creative narrative response.

77. A method according to claim 14 wherein said scoring step includes a step of cumulatively adding scoring increments to said score, said method permitting persons at remote locations to participate in task-setting programs of the type requiring answers to multi-part questions presented by a program conductor, said scoring increments corresponding to the parts of said multi-part questions answered in a manner meeting response criteria.

78. A method according to claim 14 wherein said step of formulating task-setting messages includes the formulation of questions which are selected from a question group consisting of multi-part questions, questions requiring a single or multi-choice answer, and questions requiring a minimum number of answers.

79. A method according to claim 14 further comprising a step of providing a television presentation for communicating between said central station and said remote audience, said members of said remote audience being contestants of a television audience located at said remote locations, there being a host at said central station;

a step by the host of informing the television audience of specified alternative subject areas of a question prior to asking a question, and a step by a contestant of selecting a subject area prior to knowing the specific question.

80. A system according to claim 7 wherein contestants are located at said remote sites, the system further comprising means at said remote sites for alerting contestants of a correct response with opportunity to win an award.

81. A method according to claim 2 further comprising steps of announcing and dispensing of a award to a successful contestant at one of said remote locations, there being a step of delaying the dispensing and the announcing of the award to the successful contestant for a determined interval of response by the studio audience.

82. A method according to claim 14 wherein said step of creating includes a step of outputting a voucher suitable for exchange for an award.

83. A method according to claim 1 or 14 wherein each step of transmitting task-setting message signals includes a transmitting of questions on an automated cable television channel for displaying on screens in remote locations, the displaying including alphanumeric or graphic forms of display.

84. A system according to claim 7 or 9-13 inclusive wherein said means for transmitting a program signal transmits questions in alphanumeric form, graphic form, or a combination of alphanumeric and graphic forms by an automated cable television channel for display on screens in remote locations.

85. A method for remotely evaluating and creating a record of responses to task-setting signal messages electronically transmitted to receivers at remote locations, which method comprises the steps of:

formulating a radio program comprising a plurality of tasks to be performed sequentially by members of the radio audience and to be conveyed to said members in the form of task-setting electronic signal messages;

transmitting said electronic task-setting signal messages from a central station on an assigned radio frequency;

receiving said electronic task-setting signal messages at remote locations;

formatting response criteria governing responses to a task, said response criteria including acceptable responses, a scoring basis with difficulty level and a timing of said responses for determined time intervals;

transmitting electronic signals conveying response criteria on a subcarrier of an assigned radio frequency to said remote locations prior to or substantially concurrently with the transmission of said task-setting signal messages;

receiving said electronic signals conveying response criteria at remote locations;

entering responses on a data entry device at said remote locations;

comparing said responses with acceptable responses meeting said response criteria;

identifying individual ones of said responses meeting said response criteria;

scoring each response relative to the scoring basis of said response criteria;

creating a record on a recording medium at each said remote locations of scored response results from said scoring step, wherein said creating includes providing said record with at least one distinguishing indicium selected from a group consisting of discrete dashes, connected, dashes, dots, regular shapes, irregular shapes, codes, numbers, letters and symbols, so as to prevent tampering, forging, and counterfeiting;

modifying by at least partially reformatting individual ones of said response criteria independently of said transmitting of said task-setting messages, so as to individually govern a subsequent task;

transmitting electronic signals conveying reformatted response criteria on a subcarrier of an assigned radio-frequency;

repeating the foregoing steps, wherein a repetition of modifying response criteria includes a reformatting of individual ones of said first-mentioned response criteria independently of said transmitting of said task-setting signal messages, to be applied to tasks of subsequent ones of said task-setting signal messages.

86. A system according to claim 7 or 9-13 inclusive wherein said means for transmitting a program signal transmits said program solely by radio.

87. A system according to claim 7 or 9-13 inclusive wherein said means for transmitting a program signal transmits the program signal by presentation in a form of audio presentation, visual presentation, or a combination of audio and visual presentations.

88. A system according to claim 14 wherein said response-criteria signals are transmitted to said remote locations prior to the transmission of said task-setting signals.

89. A system according to claim 14 wherein said response-criteria signals are transmitted to said remote locations concurrently with the transmission of said task-setting signals.

90. A system according to claim 14 wherein said response-criteria signals are transmitted to said remote locations subsequent to the transmission of said task-setting signals.

91. A system according to claim 70 wherein said response-criteria signals are transmitted to members of said remote audience prior to the transmission of said audio-visual signals.

92. A system according to claim 70 wherein said response-criteria signals are transmitted to members of said remote audience concurrently with the transmission of said audio-visual signals.

93. A system according to claim 70 wherein said response-criteria signals are transmitted to members of said remote audience subsequent to the transmission of said audio-visual signals.

* * * * *